United States Patent
Kim

(10) Patent No.: US 10,021,378 B2
(45) Date of Patent: Jul. 10, 2018

(54) DISPLAY APPARATUS AND OPERATION METHOD THEREOF

(71) Applicant: LG ELECTRONICS INC., Seoul (KR)

(72) Inventor: Sung Hwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 191 days.

(21) Appl. No.: 14/912,738

(22) PCT Filed: Dec. 9, 2013

(86) PCT No.: PCT/KR2013/011344
§ 371 (c)(1),
(2) Date: Feb. 18, 2016

(87) PCT Pub. No.: WO2015/026017
PCT Pub. Date: Feb. 26, 2015

(65) Prior Publication Data
US 2016/0205391 A1 Jul. 14, 2016

(30) Foreign Application Priority Data
Aug. 19, 2013 (KR) .................. 10-2013-0098032

(51) Int. Cl.
*H04N 5/765* (2006.01)
*H04N 13/04* (2006.01)
(Continued)

(52) U.S. Cl.
CPC ....... *H04N 13/0497* (2013.01); *G09G 3/3225* (2013.01); *H04N 13/0429* (2013.01);
(Continued)

(58) Field of Classification Search
CPC .... G09G 3/003; G09G 3/3225; G09G 3/3406; H04N 13/0429; H04N 13/0468; H04N 13/0475; H04N 13/0477; H04N 13/0497
(Continued)

(56) References Cited

U.S. PATENT DOCUMENTS

| 8,395,656 B1 * | 3/2013 | Malzbender | H04N 5/4403 348/14.08 |
| 2002/0135596 A1 * | 9/2002 | Yamamoto | A63F 13/10 345/589 |

(Continued)

FOREIGN PATENT DOCUMENTS

| EP | 2141921 A1 | 1/2010 |
| EP | 2315186 A2 | 4/2011 |

(Continued)

*Primary Examiner* — Robert Chevalier
(74) *Attorney, Agent, or Firm* — Dentons US LLP

(57) ABSTRACT

A display apparatus is disclosed. The display apparatus includes a video reception unit to receive an input video, a flexible display module, and a controller to change luminance of the input video such that a luminance variation of an area of the input video corresponding to a first area of the display module is greater than that of an area of the input video corresponding to a second area of the display module and control a video, the luminance of which has been changed, to be displayed when the display module is curved. Consequently, a stereoscopic video with improved luminance is displayed on the display apparatus.

20 Claims, 20 Drawing Sheets

(51) Int. Cl.
*G09G 3/3225* (2016.01)
*G09G 3/34* (2006.01)
*G09G 3/00* (2006.01)

(52) U.S. Cl.
CPC ..... *H04N 13/0468* (2013.01); *H04N 13/0475* (2013.01); *H04N 13/0477* (2013.01); *G09G 3/003* (2013.01); *G09G 3/3406* (2013.01); *G09G 2300/0842* (2013.01); *G09G 2320/0261* (2013.01); *G09G 2320/0686* (2013.01); *G09G 2354/00* (2013.01); *G09G 2360/144* (2013.01); *G09G 2380/02* (2013.01)

(58) Field of Classification Search
USPC ................. 348/51, 53, 57, 59; 386/200, 230
See application file for complete search history.

(56) References Cited

U.S. PATENT DOCUMENTS

| | | |
|---|---|---|
| 2009/0303216 A1 | 12/2009 | Shin |
| 2011/0273626 A1 | 11/2011 | Yoo et al. |
| 2012/0092363 A1 | 4/2012 | Kim et al. |
| 2013/0207946 A1 | 8/2013 | Kim et al. |
| 2014/0368527 A1* | 12/2014 | Fujine ..................... H04N 5/20 345/589 |

FOREIGN PATENT DOCUMENTS

| | | |
|---|---|---|
| EP | 2500894 A1 | 9/2012 |
| EP | 2605517 A2 | 6/2013 |
| KR | 10-2007-0079221 A | 8/2007 |
| KR | 10-2008-0062546 A | 7/2008 |
| KR | 10-2011-0001545 A | 1/2011 |
| WO | 2012/035193 A1 | 3/2012 |

\* cited by examiner

[ Fig. 1]
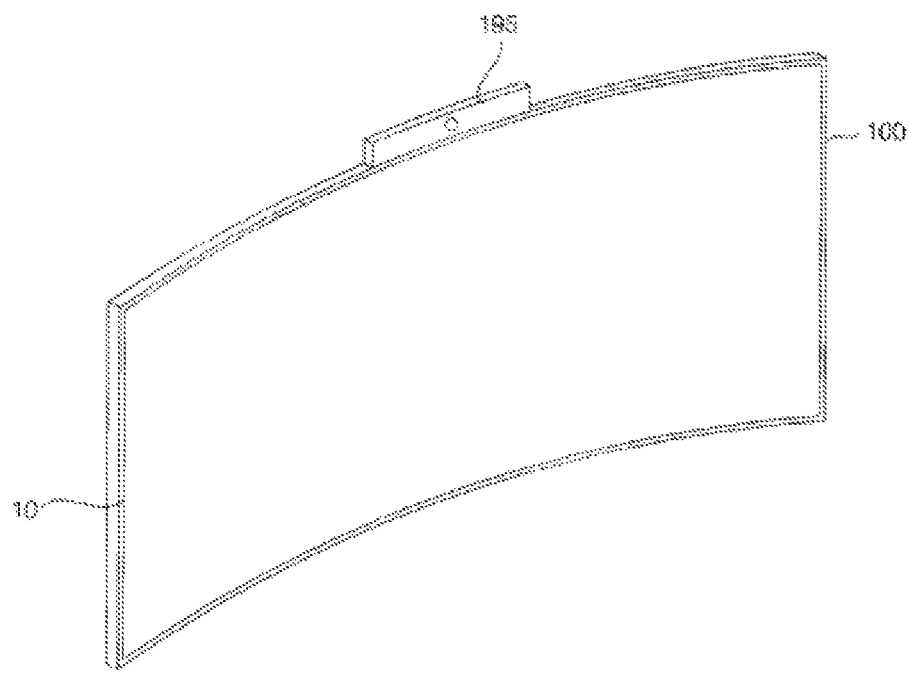

[Fig. 2]
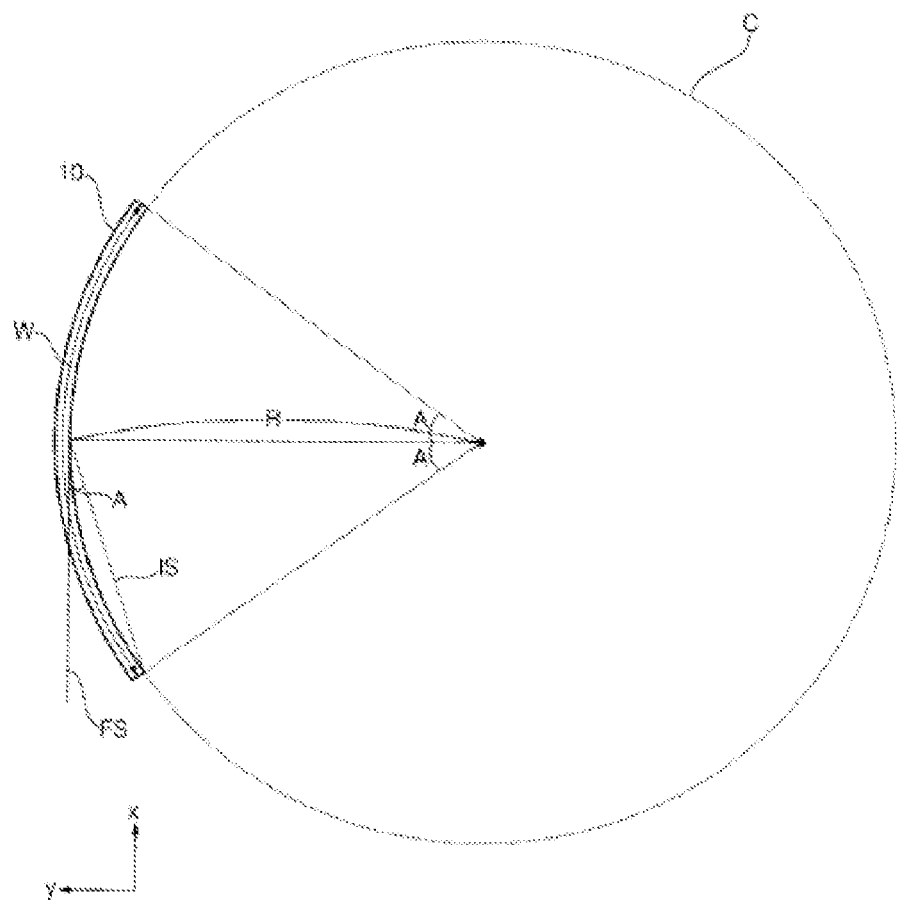

[Fig. 3]
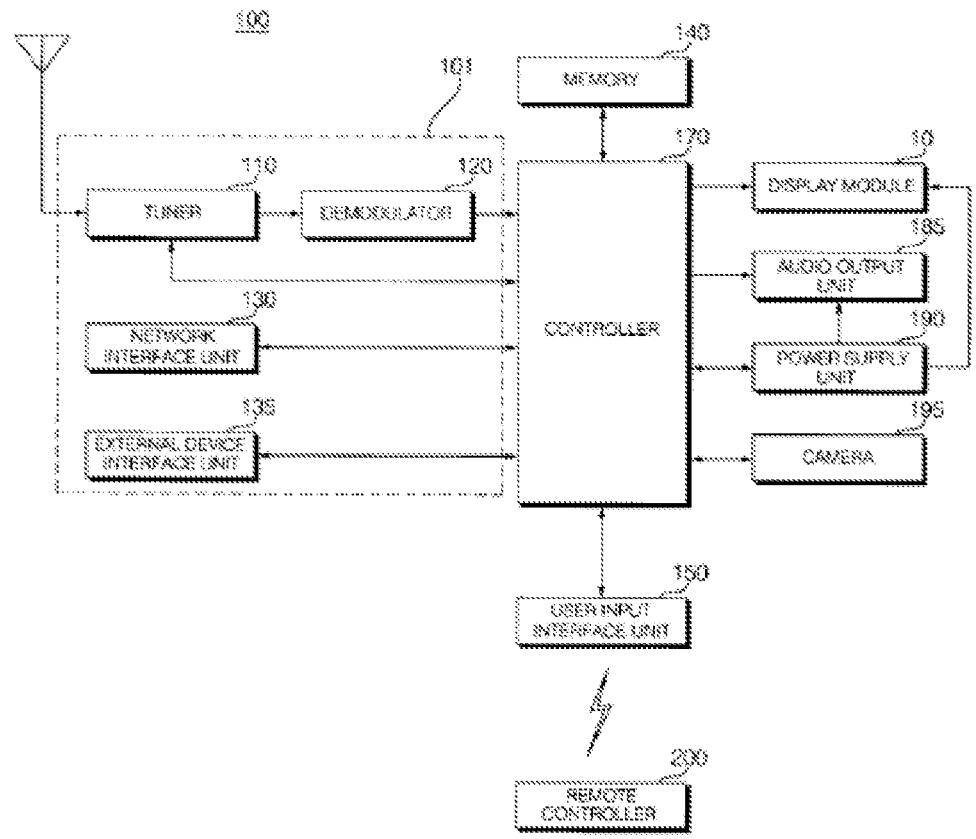
[Fig. 4]
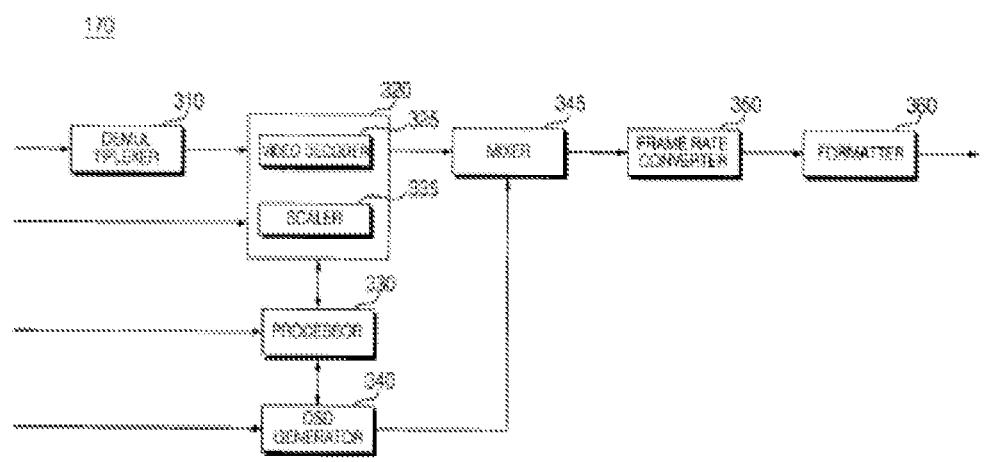

[ Fig. 5]
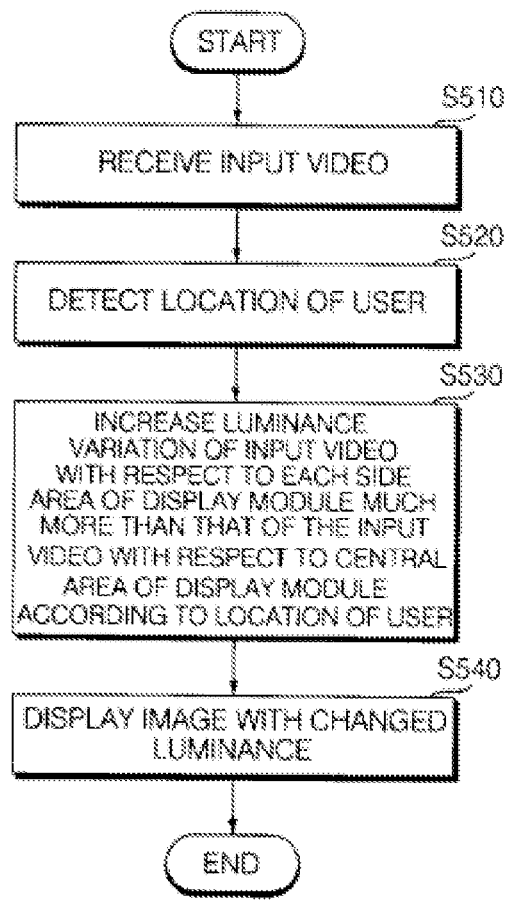

[Fig. 6]
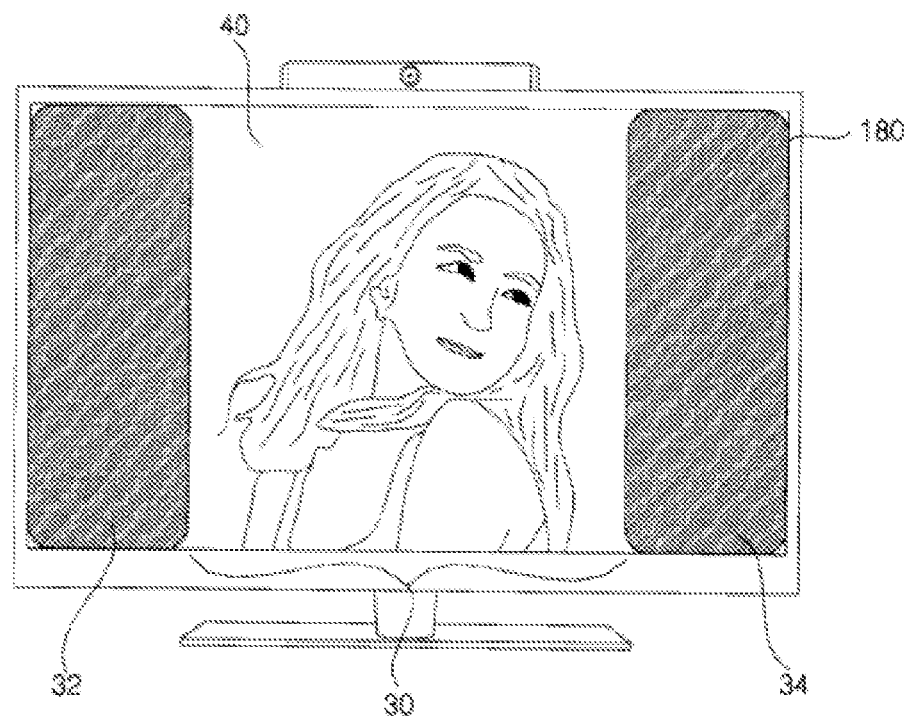

[Fig. 7]
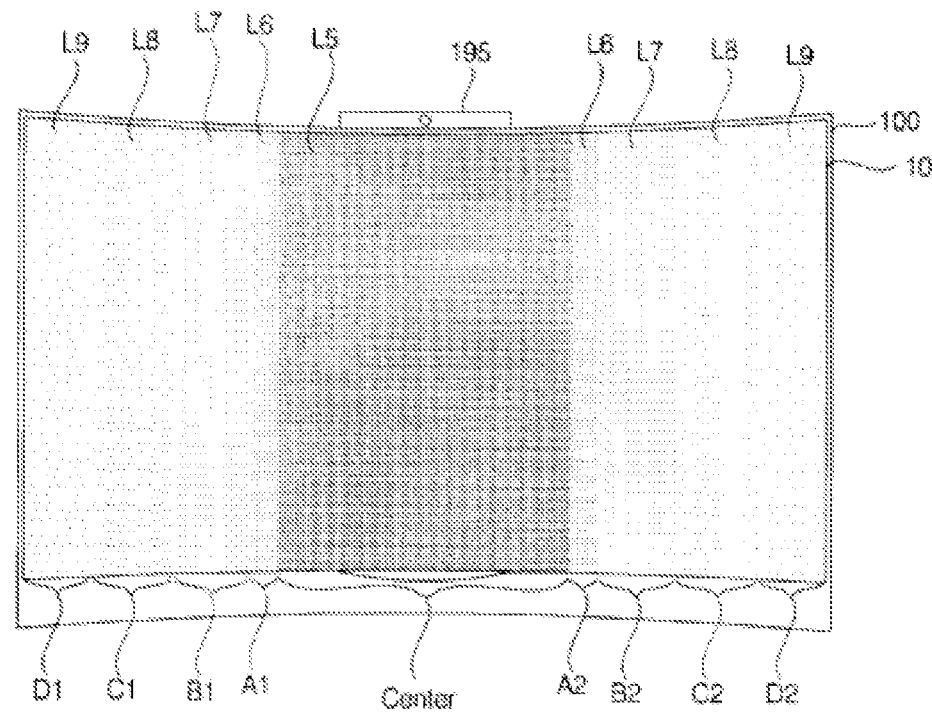
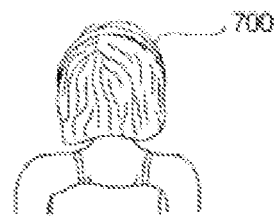

[Fig. 8]
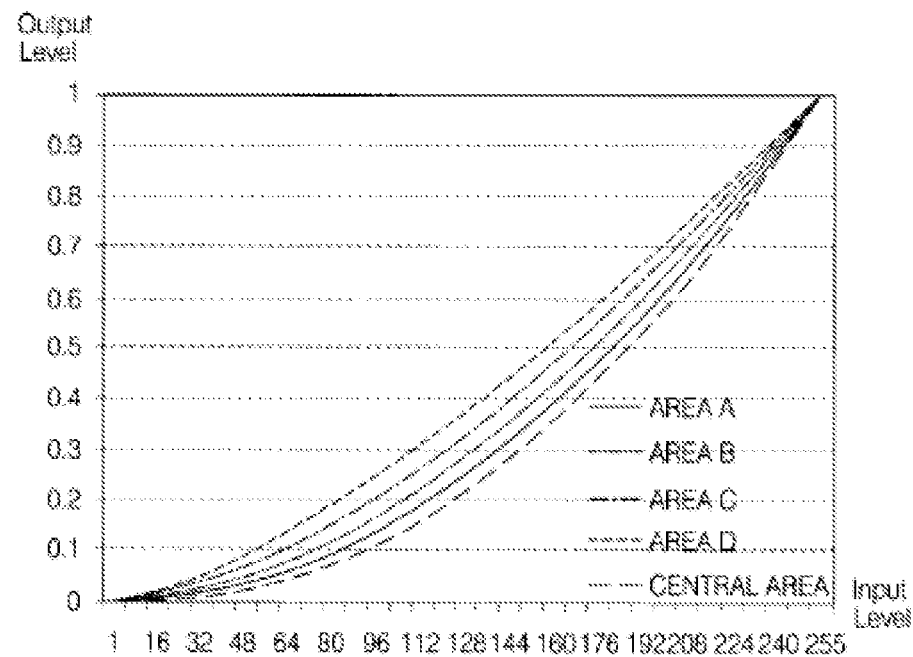
[Fig. 9]
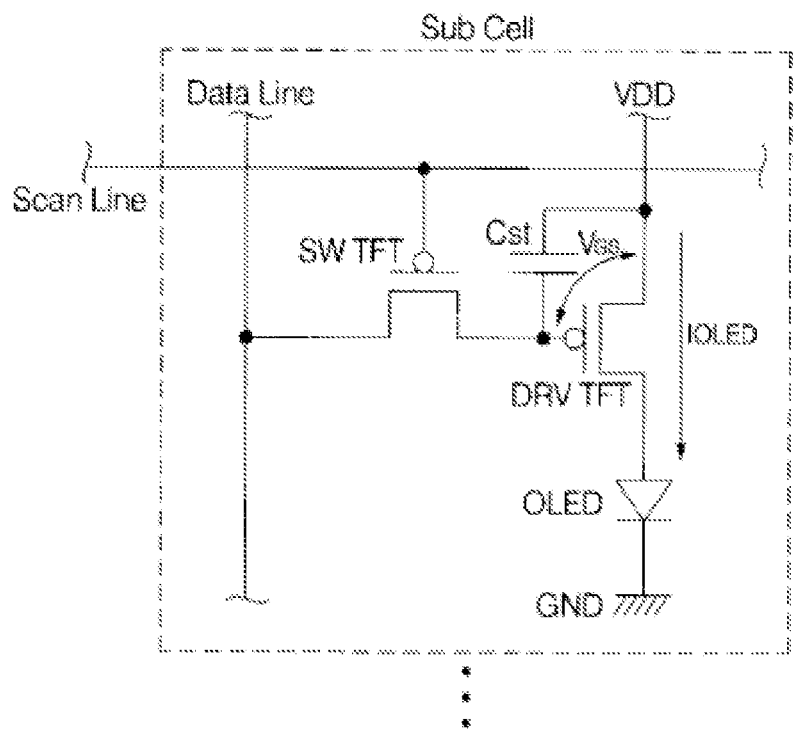

[ Fig. 10]
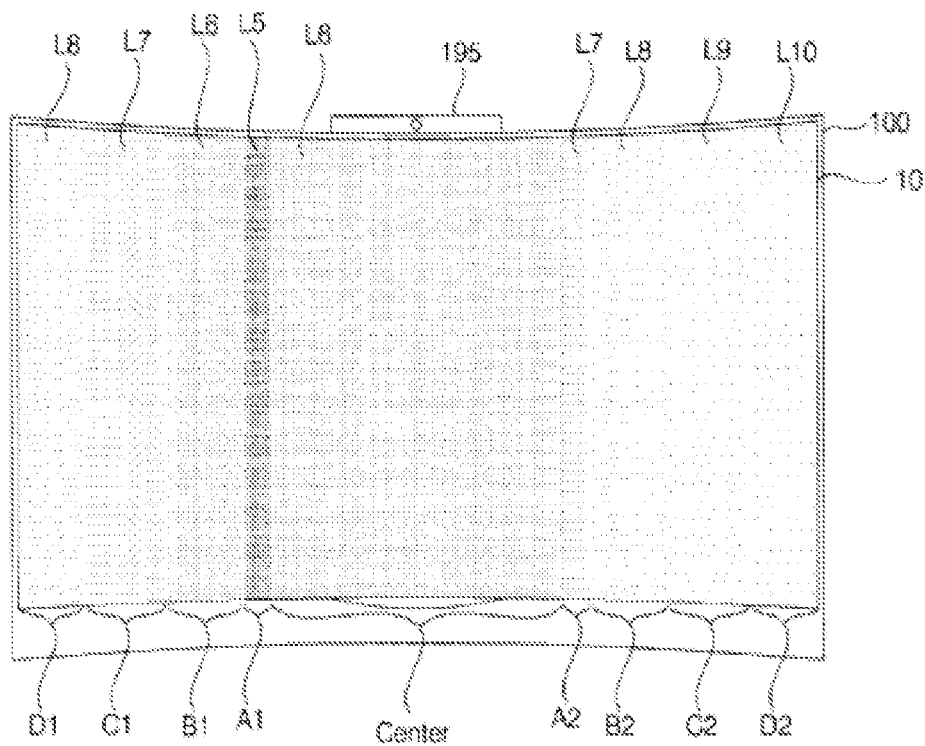
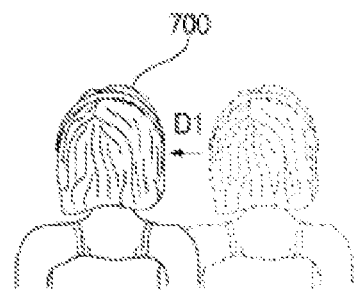

[Fig. 11]
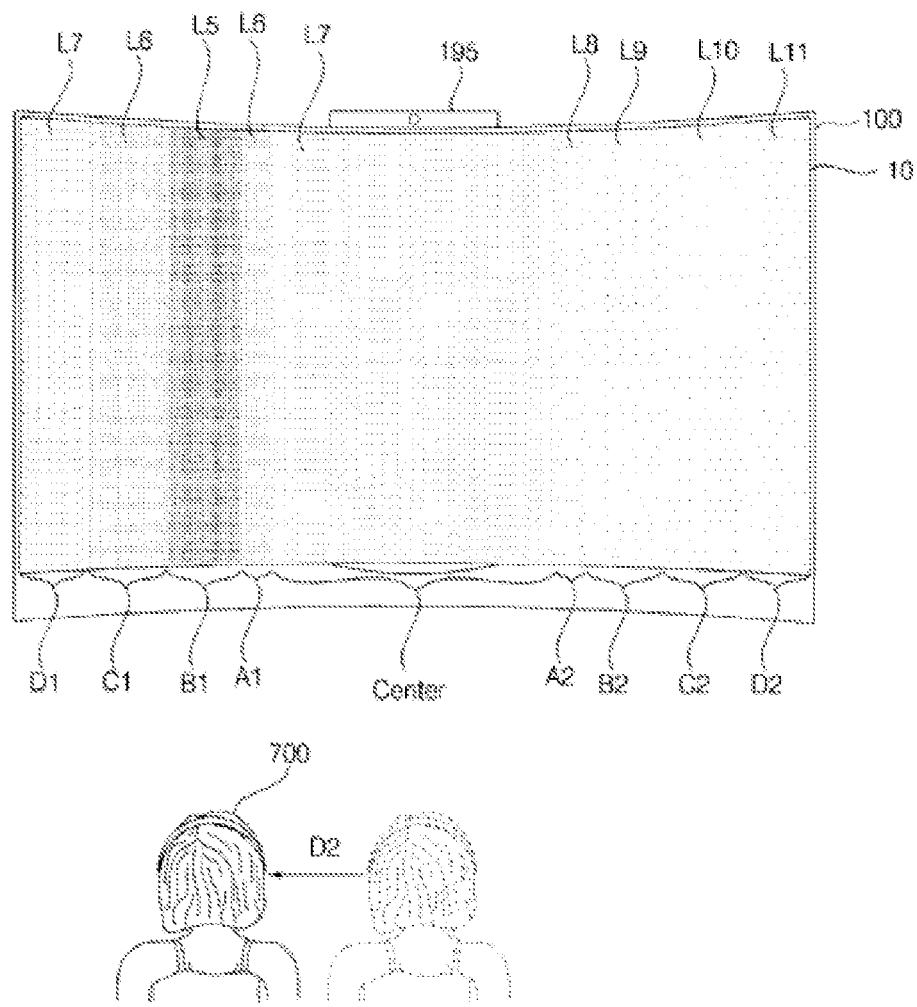

[Fig. 12]
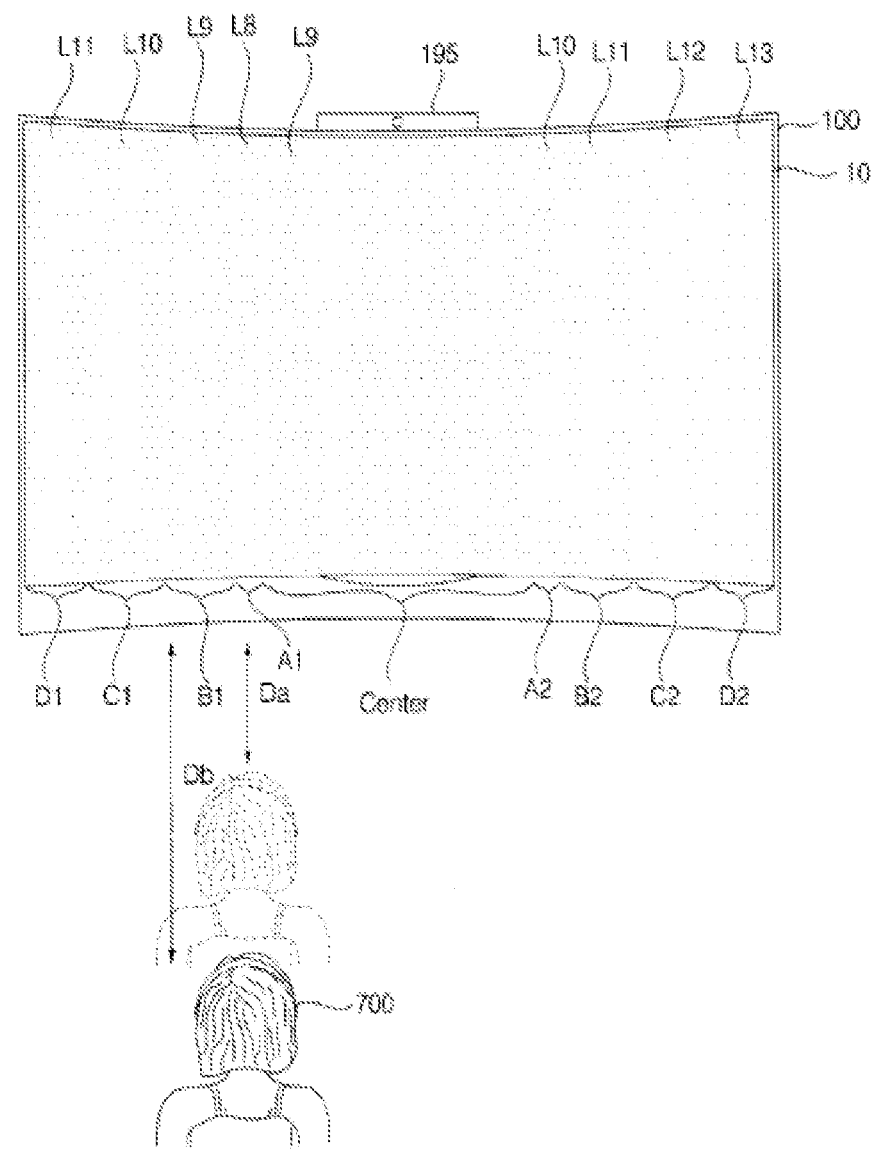

[ Fig. 13]
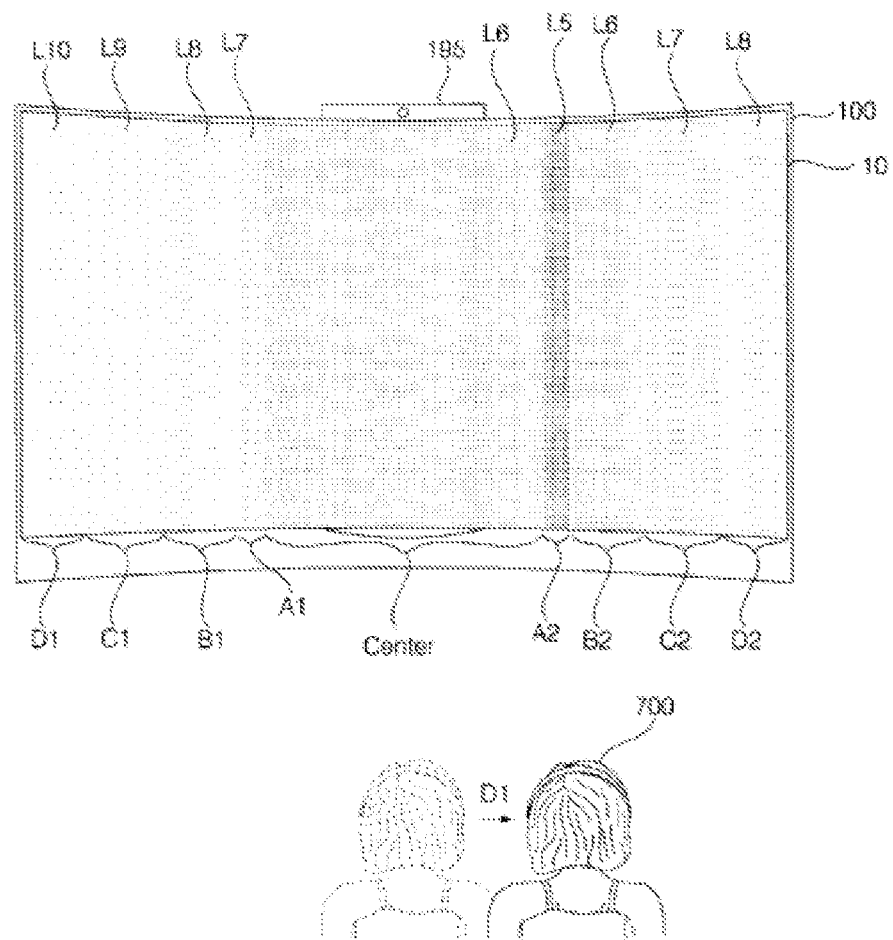

[Fig. 14]
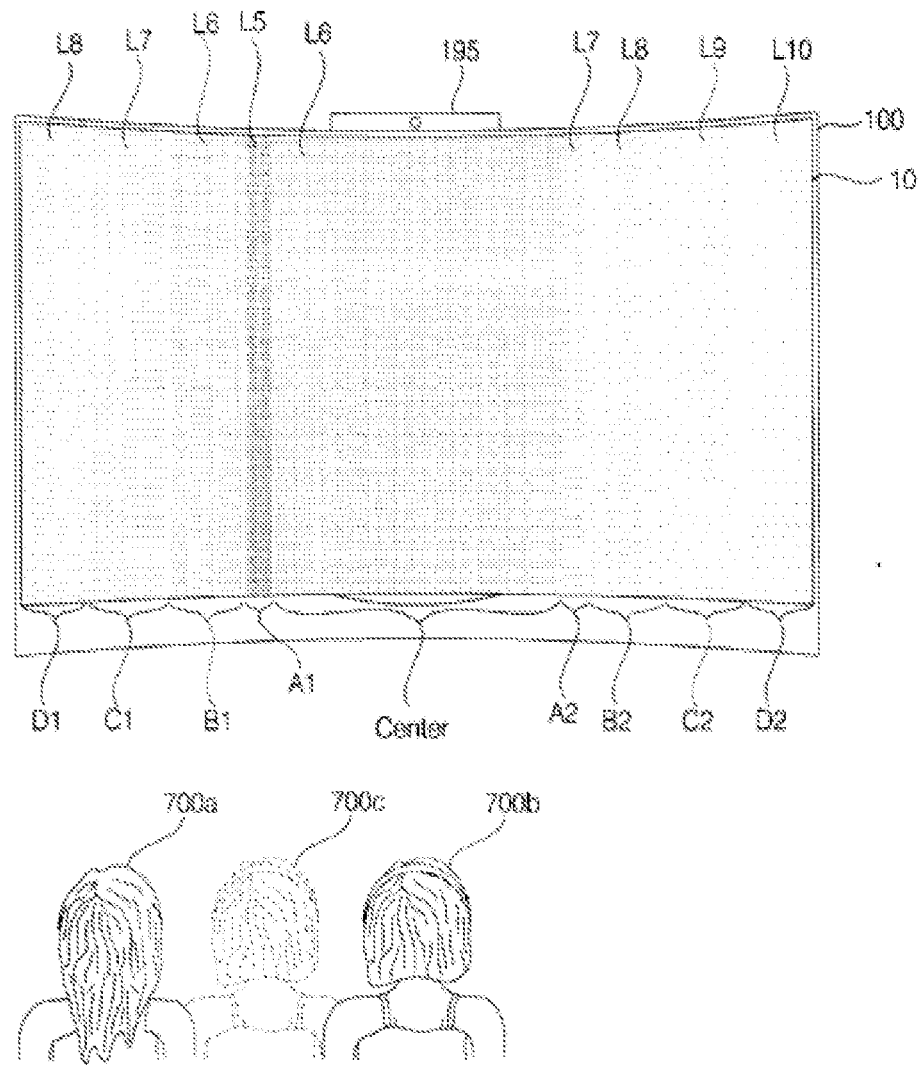

[Fig. 15]
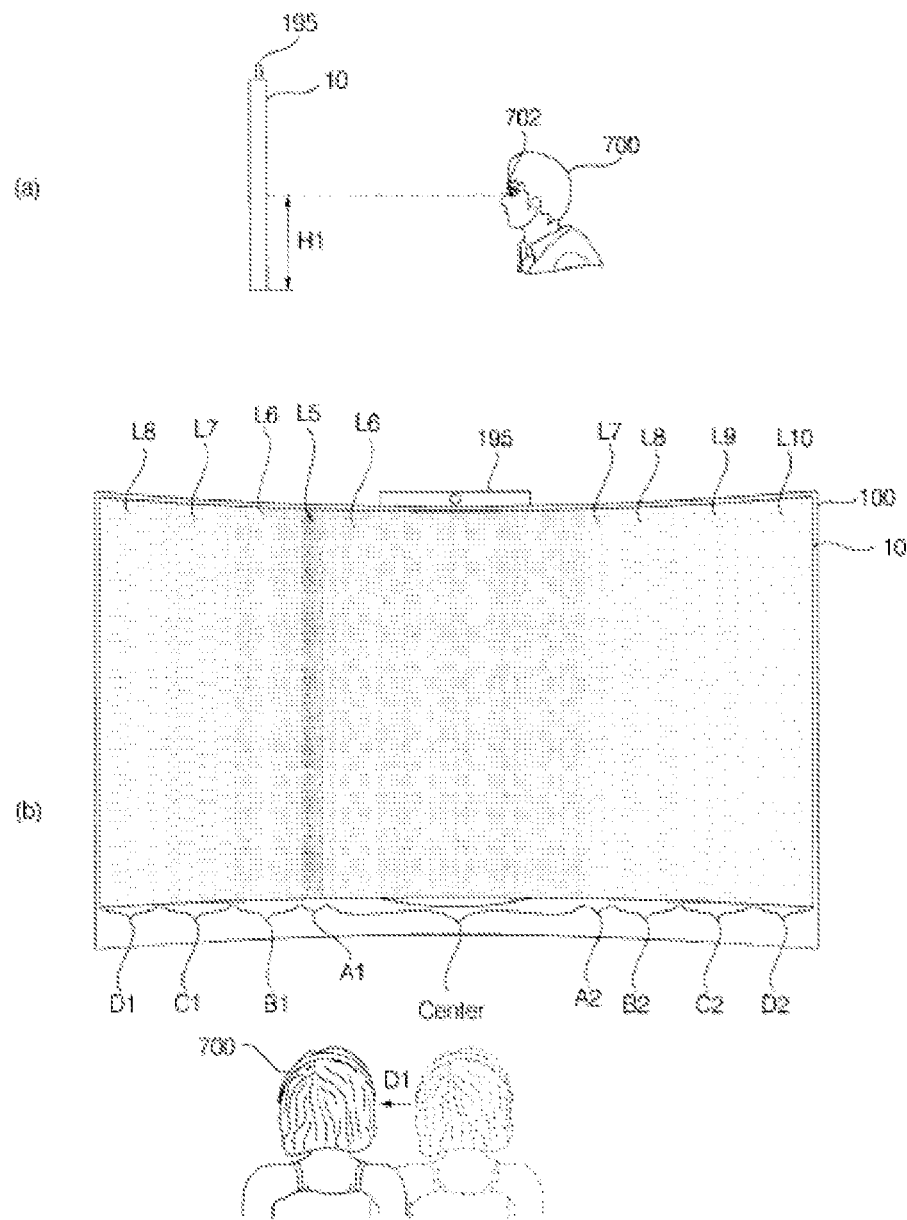

[Fig. 16]
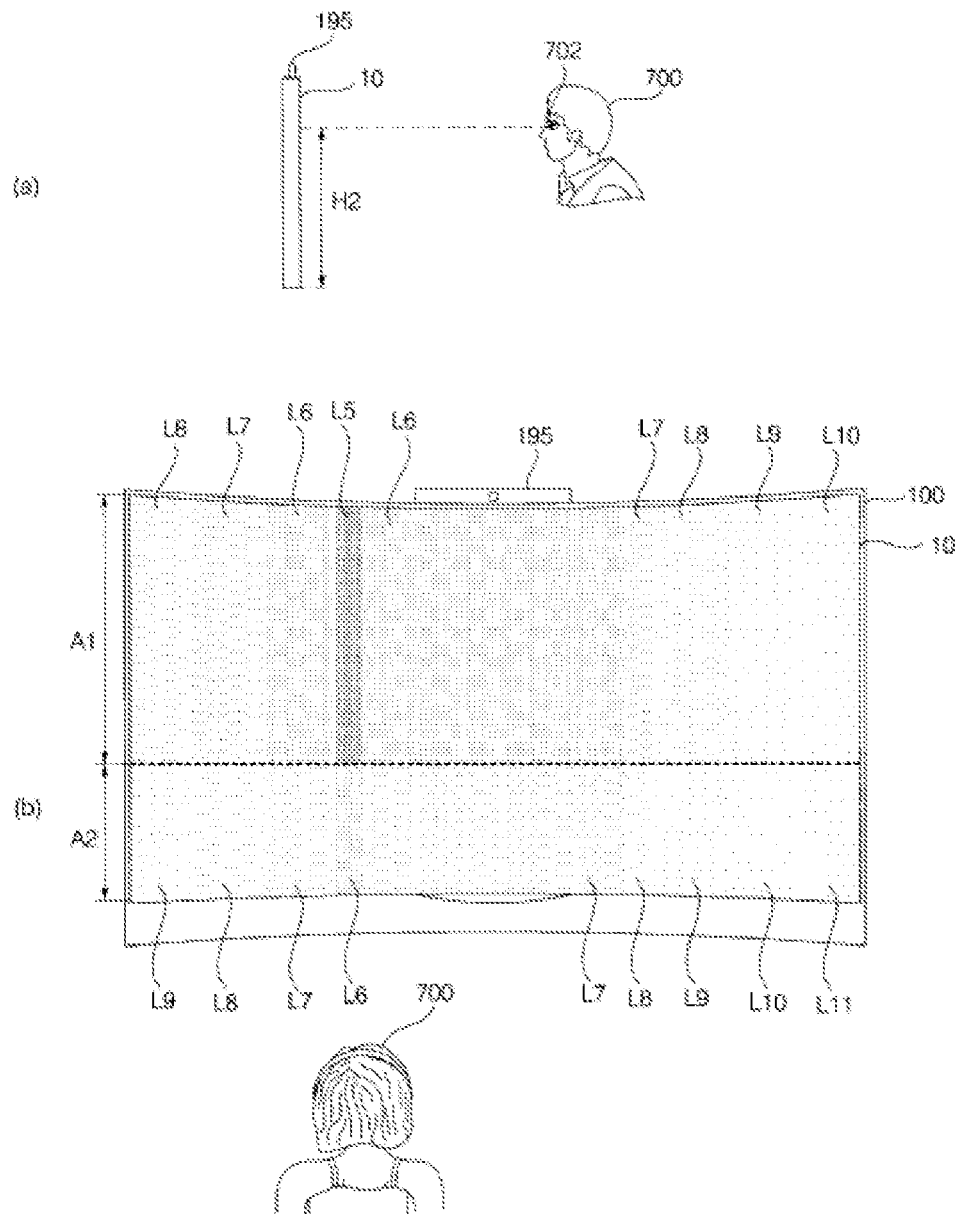

[Fig. 17]
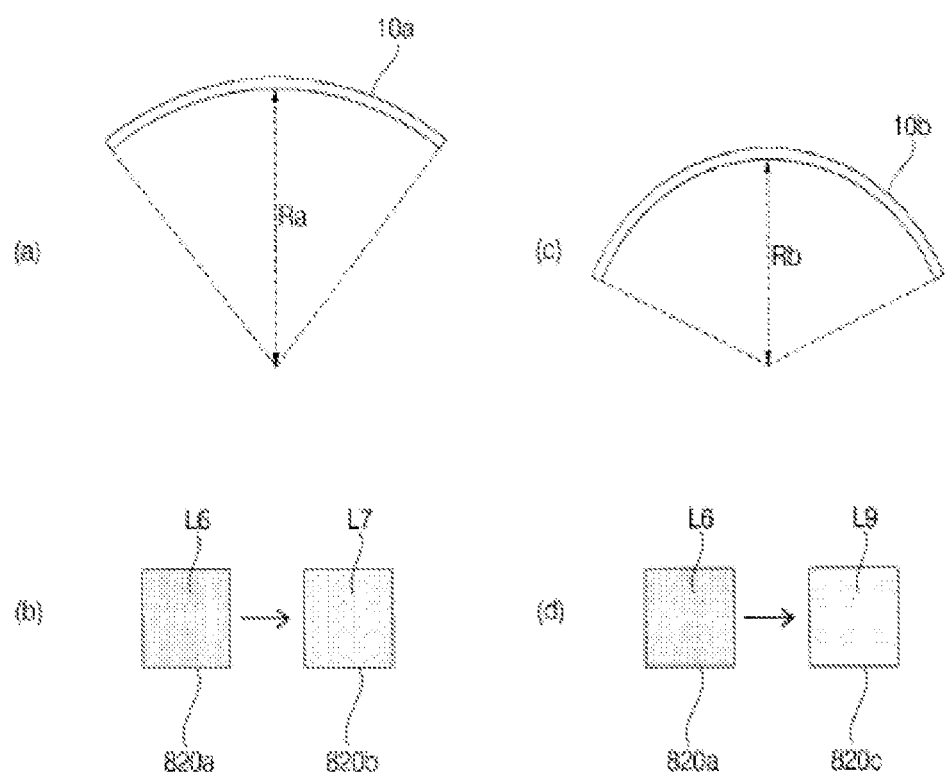

[Fig. 18]
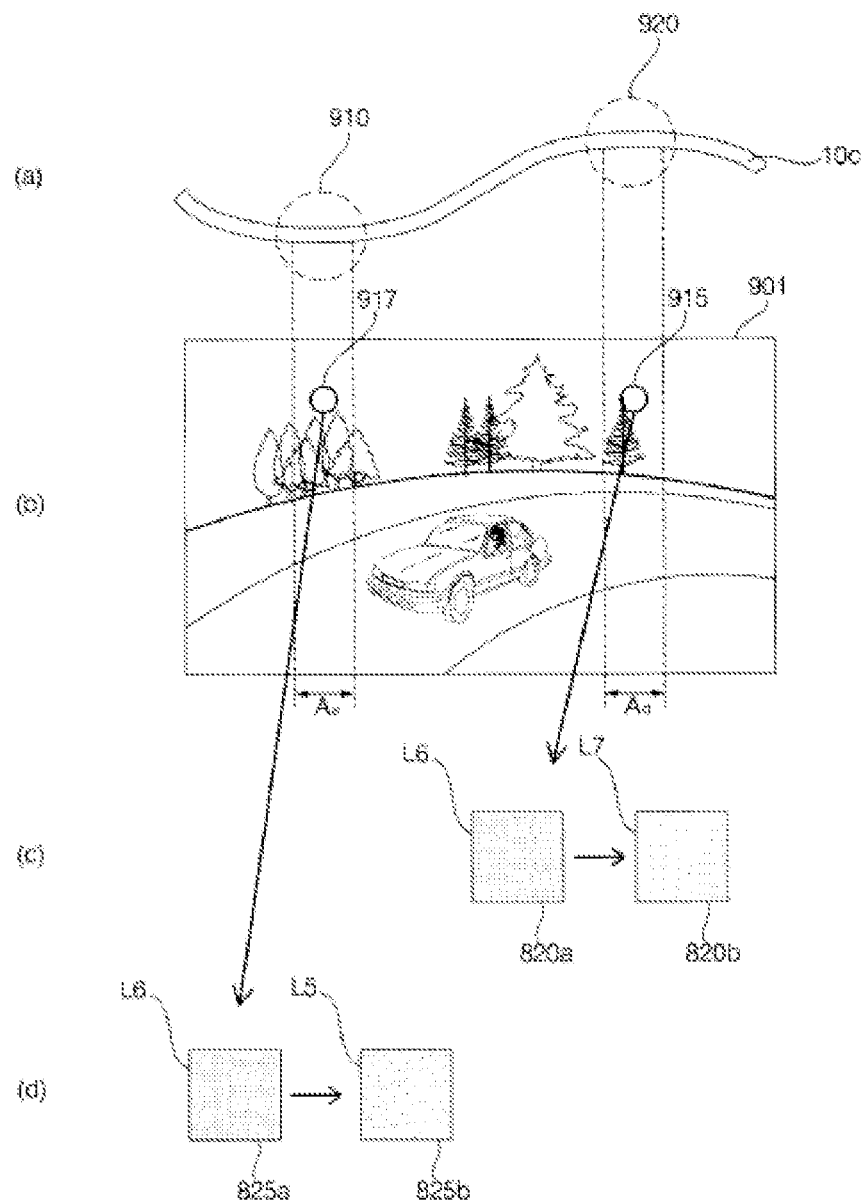

[Fig. 19]
[Fig. 20]
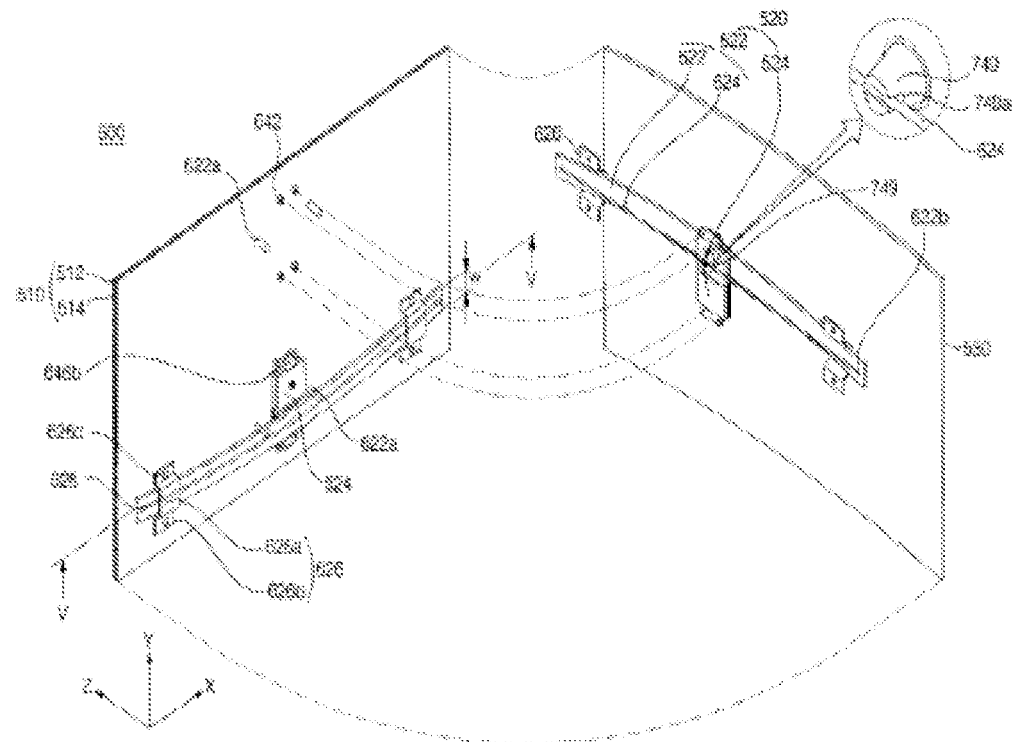

[ Fig. 21]
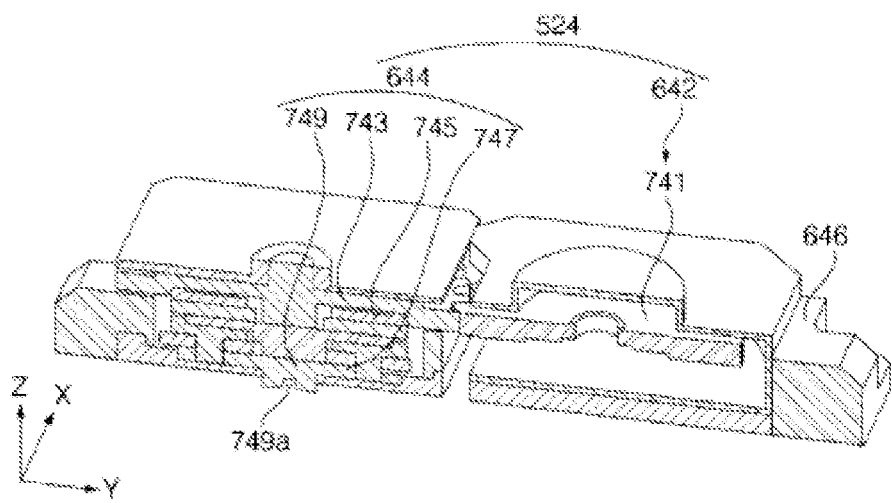

[Fig. 22]
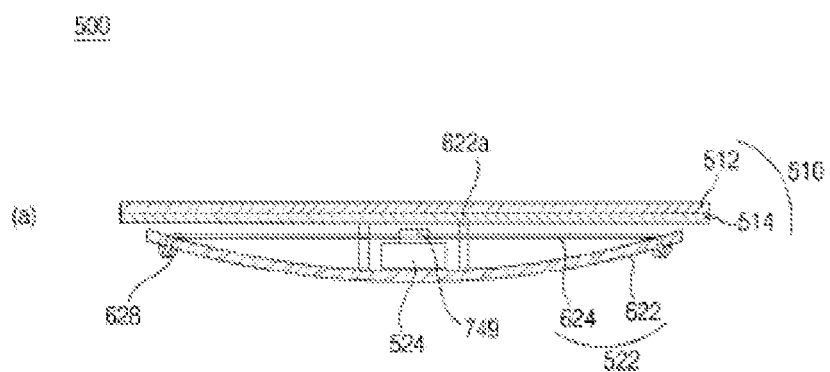
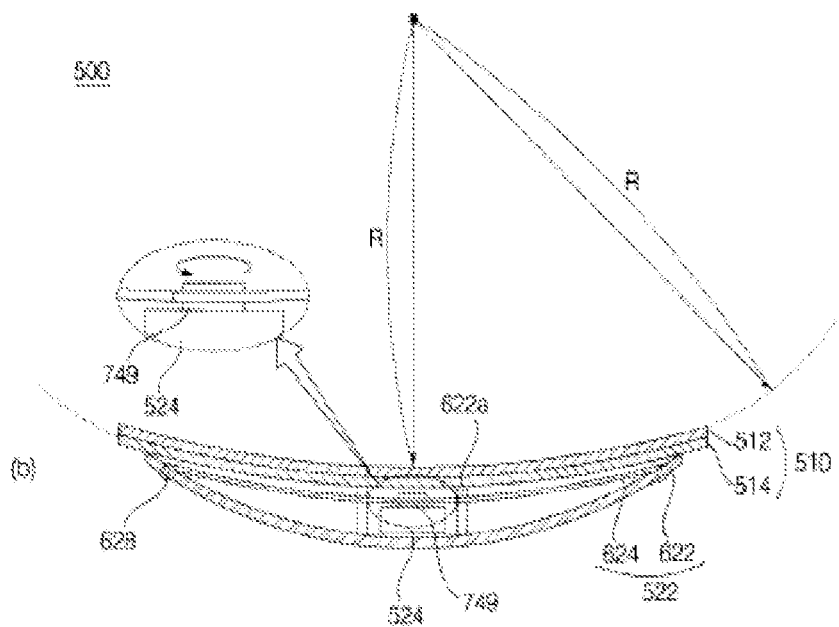

[Fig. 23]
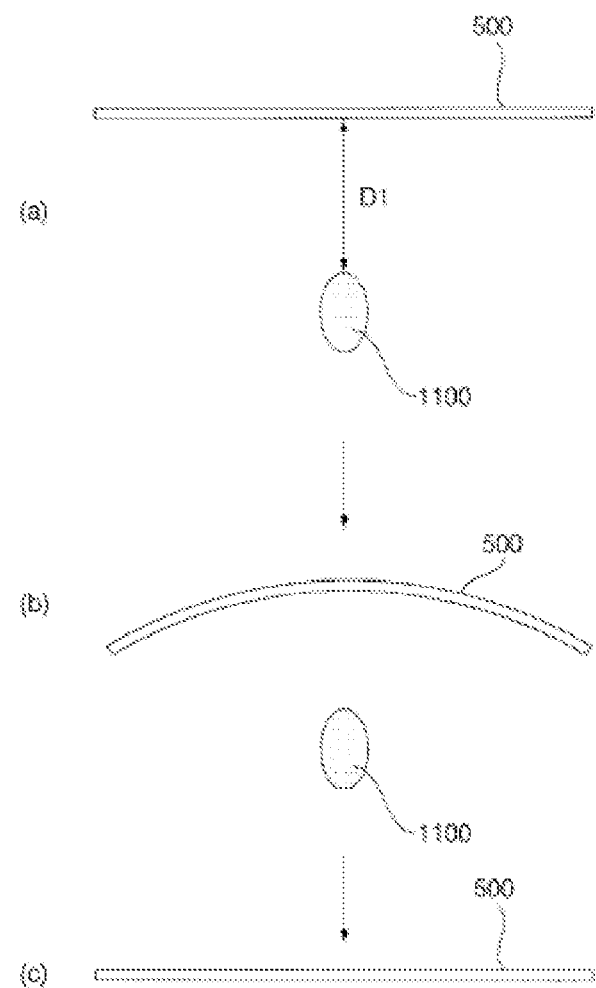

DISPLAY APPARATUS AND OPERATION METHOD THEREOF

This application is a U.S. National Phase Application under 35 U.S.C. § 371 of International Application PCT/KR2013/011344 filed on Dec. 9, 2013, which claims the benefit of Korean Application No. 10-2013-0098032, the entire content of the prior applications is hereby incorporated by reference.

TECHNICAL FIELD

The present invention relates to a display apparatus and an operation method thereof and, more particularly, to a display apparatus that is capable of displaying a stereoscopic video with improved luminance and an operation method thereof.

BACKGROUND ART

Various types of display apparatuses to display a video have been used. For example, a liquid crystal display panel, a plasma display panel, and an organic light emitting diode display panel are used.

As the display apparatuses are being used in an increasingly wider variety of fields, various characteristics are required in the respective fields. In addition to characteristics related to simple display of a video, various demands in consideration of a stereoscopic effect and immersion have increased. In order to satisfy such various demands, research is continuously underway into display apparatus structures.

DISCLOSURE OF INVENTION

Technical Problem

It is an object of the present invention to provide a display apparatus that is capable of displaying a stereoscopic video with improved luminance and an operation method thereof.

Solution to Problem

In accordance with an aspect of the present invention, the above and other objects can be accomplished by the provision of a display apparatus including a video reception unit to receive an input video, a flexible display module, and a controller to change luminance of the input video such that a luminance variation of an area of the input video corresponding to a first area of the display module is greater than that of an area of the input video corresponding to a second area of the display module and control a video, the luminance of which has been changed, to be displayed when the display module is curved.

In accordance with another aspect of the present invention, there is provided a display apparatus including a video reception unit to receive an input video, a flexible display module, and a controller to control the display module such that a level of current flowing in an area of the input video corresponding to a first area of the display module is greater than that of current flowing in an area of the input video corresponding to a second area of the display module when the display module is curved.

In accordance with a further aspect of the present invention, there is provided an operation method of a display apparatus including a flexible display module, the operation method including receiving an input video, changing luminance of the input video such that a luminance variation of an area of the input video corresponding to a first area of the display module is greater than that of an area of the input video corresponding to a second area of the display module when the display module is curved, and displaying a video, the luminance of which has been changed.

Advantageous Effects of Invention

As is apparent from the above description, the display apparatus according to the embodiment of the present invention changes luminance of an input video such that a luminance variation of the area of the input video corresponding to the first area of the curved display module is greater than that of the area of the input video corresponding to the second area of the curved display module and displays the video, the luminance of which has been changed, on the curved display module. Consequently, luminance of the dark area of the video is improved and, therefore, a stereoscopic video with improved luminance is displayed on the display apparatus.

In addition, the display apparatus according to the embodiment of the present invention changes luminance of the input video based on location of a user. Specifically, the display apparatus according to the embodiment of the present invention changes luminance of the input video such that the luminance variation is increased with respect to one of the opposite sides of the display module which is more distant from the user. Consequently, it is possible for the user to watch a stereoscopic video with improved luminance.

In addition, the display apparatus according to the embodiment of the present invention changes luminance of the input video based on the distance between the user and the display apparatus. Specifically, the display apparatus according to the embodiment of the present invention changes luminance of the input video such that the luminance variation is increased as the distance between the user and the display apparatus is increased. Consequently, it is possible for the user to watch a stereoscopic video with improved luminance.

In addition, the display apparatus according to the embodiment of the present invention changes luminance of the input video based on the gaze distance of the user. Specifically, the display apparatus according to the embodiment of the present invention changes luminance of the input video such that the luminance variation is increased as the gaze distance of the user is increased. Consequently, it is possible for the user to watch a stereoscopic video with improved luminance.

In addition, the display apparatus according to the embodiment of the present invention changes luminance of the input video based on the curvature of the display module. Specifically, the display apparatus according to the embodiment of the present invention changes luminance of the input video such that the luminance variation is increased as the curvature of the display module is decreased. Consequently, it is possible for the user to watch a stereoscopic video with improved luminance.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a display apparatus according to an embodiment of the present invention;

FIG. 2 is a plan view showing a display module of the display apparatus of FIG. 1;

FIG. 3 is an internal block diagram of the display apparatus of FIG. 1;

FIG. 4 is an internal block diagram of a controller of FIG. 3;

FIG. 5 is a flowchart showing an operation method of a display apparatus according to an embodiment of the present invention;

FIGS. 6 to 18 are reference views illustrating the operation method of FIG. 5;

FIG. 19 is a rear exploded perspective view showing a display apparatus according to another embodiment of the present invention;

FIG. 20 is a perspective view showing a drive unit of FIG. 19;

FIG. 21 is a cutaway perspective view of FIG. 20;

FIG. 22 is a view illustrating the change in shape of the display apparatus based on FIGS. 19 to 21; and FIG. 23 is a reference view illustrating the change in curvature of the display apparatus of FIG. 19.

BEST MODE FOR CARRYING OUT THE INVENTION

Reference will now be made in detail to the preferred embodiments of the present invention, examples of which are illustrated in the accompanying drawings. However, the present disclosure may be embodied in many different forms and should not be construed as limited to the embodiments set forth herein.

In order to clearly and simply describe the present invention, portions irrelevant to the description of the present invention are omitted from the drawings. Throughout the specification, identical or nearly identical components are denoted by the same reference numerals. In the drawings, thickness, width, etc. are enlarged or reduced in order to more clearly describe the present invention. In the present invention, however, thickness, width, etc. are not limited to those shown in the drawings.

In a case in which one part "includes" another part throughout the specification, other parts are not excluded unless exclusion of the other parts is concretely described and the part may further include the other parts. In addition, in a case in which one part, such as a layer, a film, a region, or a plate, is placed "on" another part, the one part may be placed "directly on" the another part and, in addition, a further part may be disposed between the one part and the another part. In a case in which one part, such as a layer, a film, a region, or a plate, is placed "directly on" another part, it means that a further part is not disposed between the one part and the another part.

Meanwhile, the terms "module" and "unit," when attached to the names of components are used herein to help the understanding of the components and thus they should not be considered as having specific meanings or roles. Accordingly, the terms "module" and "unit" may be used interchangeably.

Hereinafter, a display apparatus according to an embodiment of the present invention will be described in detail with reference to the accompanying drawings.

FIG. 1 is a perspective view showing a display apparatus according to an embodiment of the present invention and FIG. 2 is a plan view showing a display module of the display apparatus of FIG. 1.

Referring to FIG. 1, a display apparatus 100 according to this embodiment includes a display module 10 to display a video and a camera 195.

The display module 10 according to this embodiment may be a curved display module having a curved screen. More specifically, the screen of the display module 10 may be curved so as to have a predetermined radius of curvature R. Consequently, the display module 10 is configured such that opposite side portions of the display module 10 protrude toward a user and a middle portion of the display module 10 recedes. As a result, the distance from eyes of the user to the display module 10 is uniform over the entire region of the display module 10.

Since the distance from the eyes of the user to each side portion of the display module 10 is greater than that from the eyes of the user to the middle portion of the display module 10 in a conventional art, a recognition degree of the opposite side portions of the display module 10 is lowered with the result that the opposite side portions of the display module 10 may be indistinct.

In this embodiment, on the other hand, the distance from the eyes of the user to each side portion of the display module 10 is equal to that from the eyes of the user to the middle portion of the display module 10, thereby improving a stereoscopic effect. As a result, user immersion is improved.

In this embodiment, the radius of curvature R of the display module 10 is within a predetermined range, thereby improving immersion and stability. The radius of curvature R may be changed based on the size of the screen (for example, the horizontal length of the screen) of the display module 10 and a protrusion ratio of each side portion to the middle portion of the display module 10, which will be described in more detail with reference to FIG. 2.

The protrusion ratio of each side portion to the middle portion of the display module 10 may be defined by an angle A between a flat surface FS extending from the middle portion of the display module 10 and an inclined surface IS extending from the middle portion to each side portion of the display module 10. Since the inclined surface IS is at a right angle to a virtual circle C having the radius of curvature R of the display module 10, a central angle of a sector having an arc formed by the display module 10 on the virtual circle C is 2A.

At this time, a ratio of a horizontal length W of the display module 10 to the central angle 2A is equal to a ratio of a circumferential length of the virtual circle C to a total angle (360 degrees) as represented by Equation 1 below.

$$2A:W=360:2\pi R \qquad \text{[Equation 1]}$$

In this case, a radius of curvature RA of the display module 10 based on the horizontal length W of the display module 10 at a specific angle A is defined as follows.

$$RA=(360W)/\{(2\pi)?(2A)\} \qquad \text{[Equation 2]}$$

At this time, in this embodiment, the radius of curvature R of the display module 10 may have a value between a radius of curvature R5 (hereinafter, referred to as a "radius of curvature of five degrees") in a case in which each side portion of the display module 10 protrudes five degrees more than the middle portion of the display module 10 and a radius of curvature R15 (hereinafter, referred to as a "radius of curvature of fifteen degrees") in a case in which each side portion of the display module 10 protrudes fifteen degrees more than the middle portion of the display module 10. In a case in which the radius of curvature R of the display module 10 is less than the radius of curvature of five degrees R5, it may be difficult to equalize the distance to the middle portion of the display module 10 with the distance to each side portion of the display module 10. In a case in which the radius of curvature R of the display module 10 is greater than the radius of curvature of fifteen degrees R15, on the other hand, the radius of curvature R of the display module 10 is excessively large with the result that user inconvenience may be caused and stability of the display module 10 may be lowered.

According to Equation 2, the radius of curvature of five degrees R5 is approximately 5.8 W and the radius of curvature of fifteen degrees R15 is approximately W. As a result, a ratio of the radius of curvature R to the horizontal length W of the display module 10 according to this embodiment may be approximately 1.9:1 to 5.8:1. In this embodiment, therefore, the ratio of the radius of curvature R to the horizontal length W of the display module 10 is restricted as described above, thereby improving stability of the display module 10 while improving user immersion.

For example, the display module 10 may include an organic light emitting display panel using an organic light emitting device (OLED).

The organic light emitting display panel is a self-emissive display panel using a principle in which, when current flows in a fluorescent or phosphorescent organic thin film, electrons and holes are coupled to one another in the organic thin film to generate light. The organic light emitting display panel has various advantages in that bright and vivid video quality is provided, a viewing angle is not restricted, and power consumption is low.

In particular, the organic light emitting display panel may be manufactured by stacking the organic thin film. Consequently, the organic light emitting display panel may be flexible and, therefore, it is possible to manufacture the organic light emitting display panel such that the organic light emitting display panel has a predetermined radius of curvature R as described above. However, the present invention is not limited thereto. For example, the present invention may be applied to various display modules 10 of various structures and types.

FIG. 3 is an internal block diagram of the display apparatus of FIG. 1.

Referring to FIG. 3, the display apparatus 100 according to the embodiment of the present invention may include a video reception unit 101, a memory 140, a user input interface unit 150, a controller 170, a display module 10, an audio output unit 185, a power supply unit 190, and a camera 195.

The video reception unit 101 receives a video input from an external device. Specifically, the video reception unit 101 may include a tuner 110, a demodulator 120, a network interface unit 130, and an external device interface unit 135.

The tuner 110 may select a broadcast signal corresponding to a channel selected by a user or all prestored channels from among broadcast signals received by an antenna. In addition, the tuner 110 may convert the selected broadcast signal into a middle frequency signal or a base band video or audio signal.

The demodulator 120 may receive a digital IF signal (DIF) converted by the tuner 110 and perform demodulation and channel decoding.

After performing the demodulation and the channel decoding, the demodulator 120 may output a stream signal (TS). In this case, the stream signal may be a multiplexed video signal, a multiplexed audio signal, or a multiplexed data signal.

The stream signal output from the demodulator 120 may be input to the controller 170. The controller 170 performs demultiplexing, video/audio signal processing, etc. Subsequently, the controller 170 outputs a video to the display module 10 and outputs an audio to the audio output unit 185.

The external device interface unit 135 may connect the display apparatus 100 to an external device. To this end, the external device interface unit 135 may include an audio/video (A/V) input and output unit (not shown).

The external device interface unit 135 may be connected to an external device, such as a digital versatile disk (DVD) player, a Blu-ray player, a game console, a camera, a camcorder, a computer (laptop computer), or a settop box, in a wired/wireless fashion. In addition, the external device interface unit 135 may perform an input operation to or an output operation from the external device.

The A/V input and output unit may include a universal serial bus (USB) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc. to input video and audio signals from the external device to the display apparatus 100.

In addition, the external device interface unit 135 may be connected to various settop boxes through at least one of the above terminals to perform an input operation to or an output operation from the settop boxes.

The network interface unit 130 may provide an interface to connect the display apparatus 100 to a wired/wireless network including the Internet. For example, the network interface unit 130 may receive content or data provided by a content provider or a network administrator over a network, such as the Internet.

On the other hand, the network interface unit 130 may include a wired communication unit (not shown) or a wireless communication unit (not shown).

The wireless communication unit may perform near field communication with another electronic apparatus. The display apparatus 100 may be connected to another electronic apparatus over a network according to a communication standard, such as Bluetooth, radio frequency identification (RFID), infrared data association (IrDA), ultra wideband (UWB), ZigBee, or digital living network alliance (DLNA).

The memory 140 may store a program to process and control signals in the controller 170. Alternatively, the memory 140 may store a signal processed video, audio, or data signal.

In addition, the memory 140 may temporarily store a video, audio, or data signal input from the external device interface unit 135 or the network interface unit 130. Furthermore, the memory 140 may store information regarding a predetermined broadcast channel using a channel memory function.

The display apparatus 100 may reproduce a content file (a video file, an image file, a music file, a text file, an application file, etc.) stored in the memory 140 such that a user can enjoy the content file.

In FIG. 3, the memory 140 is provided separately from the controller 170. However, the present invention is not limited thereto. For example, the memory 140 may be included in the controller 170.

The user input interface unit 150 transfers a signal input by a user to the controller 170 or transfers a signal from the controller 170 to the user.

For example, the user input interface unit 150 may transmit/receive a user input signal, such as power on/off, channel selection, or screen setting, to/from a remote controller 200, may transfer a user input signal input from a local key (not shown), such as a power key, a channel key, a volume key, or a setting key, to the controller 170, may transfer a user input signal input from a sensor (not shown) to sense a gesture of a user to the controller 170, or may transmit a signal from the controller 170 to the sensor (not shown).

The controller 170 may demultiplex a stream input through the tuner 110, the network interface unit 130, or the external device interface unit 135 or and process demultiplexed signals to generate and output a video or audio output signal.

The video signal processed by the controller 170 may be input to the display module 10, which may display a video corresponding to the video signal. In addition, the video signal processed by the controller 170 may be input to an external output device through the external device interface unit 135.

The audio signal processed by the controller 170 may be output to the audio output unit 185. In addition, the audio signal processed by the controller 170 may be input to an external output device through the external device interface unit 135.

Although not shown in FIG. 3, the controller 170 may include a demultiplexer and a video processing unit, which will hereinafter be described with reference to FIG. 4.

On the other hand, the controller 170 may control overall operation of the display apparatus 100. For example, the controller 170 may control the tuner 110 to tune to a channel selected by a user or an RF broadcast corresponding to a prestored channel.

In addition, the controller 170 may control the display apparatus 100 based on a user command input through the user input interface unit 150 or an internal program. In particular, the controller 170 may be connected to a network to download an application or an application list desired by a user into the display apparatus 100.

On the other hand, the controller 170 may control the display module 10 to display a video. In this case, the video displayed on the display module 10 may be a still picture or a motion picture. On the other hand, the video displayed on the display module 10 may be a two-dimensional (2D) video or a three-dimensional (3D) video.

Meanwhile, the controller 170 may detect the location of a user based on a video photographed by the camera 195. For example, the controller 170 may detect the distance (z-axis coordinate value) between the user and the display apparatus 100. In addition, the controller 170 may detect an x-axis coordinate value and a y-axis coordinate value corresponding to the location of the user.

The display module 10 coverts a video signal, a data signal, or an on-screen display (OSD) signal processed by the controller 170 or a video signal or a data signal received from the external device interface unit 135 into RGB signals to generate a drive signal.

A plasma display panel (PDP), a liquid crystal display (LCD), or an organic light emitting device (OLED) may be used as the display module 10. In addition, the display module 10 may have a 3D display function.

On the other hand, a touchscreen may be used as the display module 10. In this case, the display module 10 may be used as an input device in addition to an output device.

Meanwhile, the display module 10 according to the embodiment of the present invention may be a curved display module. For example, the display module 10 may be a flexible display module.

The audio output unit 185 receives an audio signal processed by the controller 170 and outputs the received audio signal in the form of audible sound.

The power supply unit 190 supplies power to the display apparatus 100. Specifically, the power supply unit 190 may supply power to the controller 170, which may be realized in the form of a system on chip (SOC), the display module 10 to display a video, and the audio output unit 185 to output an audio.

To this end, the power supply unit 190 may include a converter (not shown) to convert alternating current power into direct current power.

The camera 195 photographs a video and transmits the photographed video to the controller 170. At this time, the operation of the camera 195 may be controlled by the controller 170. A plurality of cameras 195 may be provided. In a case in which a plurality of cameras 195 is provided, a first time point video and a second time point video may be photographed. As a result, it is possible to calculate the distance between a user and the display apparatus.

Meanwhile, various types of cameras, such as an RGB camera and an infrared type camera, may be used as the camera 195.

The remote controller 200 transmits a user input to the user input interface unit 150. To this end, the remote controller 200 may use radio frequency (RF) communication, infrared (IR) communication, Bluetooth communication, ultra wideband (UWB) communication, ZigBee communication, etc.

In addition, the remote controller 200 may receive a video, audio, or data signal output from the user input interface unit 150 and display the received signal or output an audio or vibration.

On the other hand, the remote controller 200 may transmit coordinate value information corresponding to motion of the remote controller 200 to the display apparatus 100. As a result, a pointer corresponding to the motion of the remote controller 200 may be displayed on the display module of the display apparatus. Since the pointer is moved and displayed according to the motion of the remote controller 200 in a 3D space as described above, the remote controller 200 may be referred to as a 3D pointing device.

Meanwhile, the block diagram of the display apparatus 100 shown in FIG. 3 is a view illustrating the embodiment of the present invention. The respective components of the block diagram may be combined, added, or omitted according to the specifications of a display apparatus 100 which is actually embodied. That is, two or more components may be combined into a single component or one component may be divided into two or more components as needed. In addition, functions performed by the respective components of the block diagram illustrate the embodiment of the present invention and do not limit the scope of right of the present invention.

On the other hand, the display apparatus 100 may not include the tuner 110 and the demodulator 120 shown in FIG. 3 and may receive and reproduce a broadcast video through the network interface unit 130 or the external device interface unit 135.

FIG. 4 is an internal block diagram of the controller of FIG. 3.

Referring to FIG. 4, the controller 170 according to the embodiment of the present invention may include a demultiplexer 310, a video processing unit 320, an OSD generator 340, a mixer 345, a frame rate converter 350, and a formatter 360. In addition, the controller 170 may further include an audio processing unit (not shown) and a data processing unit (not shown).

The demultiplexer 310 demultiplexes an input stream. For example, in a case in which an MPEG-2 TS is input, the MPEG-2 TS may be demultiplexed into video, audio, and data signals. A stream signal input to the demultiplexer 310 may be a stream signal output from the tuner 110, the demodulator 120, or the external device interface unit 135.

The video processing unit 320 may process a demultiplexed video signal. To this end, the video processing unit 320 may include a video decoder 325 and a scaler 335.

The video decoder 325 decodes the demultiplexed video signal. The scaler 335 scales the resolution of the decoded video signal such that the video signal can be output to the display module 10.

Decoders based on various standards may be used as the video decoder 325.

On the other hand, the video signal decoded by the video processing unit 320 may be input to the mixer 345.

A processor 330 may control overall operation of the display apparatus 100 or the controller 170. For example, the processor 330 may control the tuner 110 to tune to a channel selected by a user or an RF broadcast corresponding to a prestored channel.

In addition, the processor 330 may control the display apparatus 100 based on a user command input through the user input interface unit 150 or an internal program.

In addition, the processor 330 may control data transmission to the network interface unit 130 or the external device interface unit 135.

In addition, the processor 330 may control operations of the demultiplexer 310, the video processing unit 320, and the OSD generator 340 of the controller 170.

The OSD generator 340 generates an OSD signal according to a user input or autonomously. For example, the OSD generator 340 may generate a signal to display various kinds of information on the screen of the display module 10 in the form of graphics or text based on a user input signal or a control signal. The generated OSD signal may include various data, such as a user interface screen, various menu screens, a widget, and an icon, of the display apparatus 100.

For example, the OSD generator 340 may generate a signal to display subtitles of a broadcast video or broadcast information based on an electronic program guide (EPG).

Meanwhile, since the OSD generator 340 generates an OSD signal or a graphic signal, the OSD generator 340 may be referred to as a graphics processing unit.

The mixer 345 may mix the OSD signal generated by the OSD generator 340 with the decoded video signal processed by the video processing unit 320. The mixed signal is provided to the formatter 360. As the decoded broadcast video signal or an external input signal is mixed with the OSD signal, an OSD may be overlaid on a broadcast video or an externally input video.

The frame rate converter (FRC) 350 may convert the frame rate of an input video. On the other hand, the frame rate converter 350 may output the input video without conversion of the frame rate of the input video.

The formatter 360 receives a signal output from the frame rate converter 350, changes the format of the received signal such that the signal is suitable for the display module 10, and outputs the signal, the format of which has been changed. For example, R, G, and B data signals may be output. The R, G, and B data signals may be output as low voltage differential signaling (LVDS) or mini-LVDS.

On the other hand, the formatter 360 may change the format of a 3D video signal or convert a 2D video into a 3D video.

Meanwhile, the audio processing unit (not shown) of the controller 170 may process a demultiplexed audio signal. To this end, the audio processing unit (not shown) may include various decoders.

In addition, the audio processing unit (not shown) of the controller 170 may adjust bass, treble, and volume of the audio signal.

The data processing unit (not shown) of the controller 170 may process a demultiplexed data signal. For example, in a case in which the demultiplexed data signal is an encoded data signal, the demultiplexed data signal may be decoded. The encoded data signal may be EPG information containing broadcast information, such as start time and end time, of a broadcast program provided by each channel.

Meanwhile, the block diagram of the controller 170 shown in FIG. 4 is a view illustrating the embodiment of the present invention. The respective components of the block diagram may be combined, added, or omitted according to the specifications of a controller 170 which is actually embodied.

In particular, the frame rate converter 350 and the formatter 360 may not be included in the controller 170 but may be separately provided.

FIG. 5 is a flowchart showing an operation method of a display apparatus according to an embodiment of the present invention and FIGS. 6 to 18 are reference views illustrating the operation method of FIG. 5.

Referring first to FIG. 5, the display apparatus 100 receives an input video (S510).

The video reception unit 101 of the display apparatus 100 may receive a broadcast video, an external video from an external device, or an external video from a network. Specifically, the video reception unit 101 may receive a broadcast video through the tuner 110, receive an external video through the external device interface unit 135, or receive an external video through the network interface unit 130.

The received input video may be transmitted to the controller 170 for signal processing.

Subsequently, the display apparatus 100 detects the location of a user (S520).

The camera 195 of the display apparatus 100 may photograph a video and transmit the photographed video to the controller 170.

The controller 170 may calculate an x coordinate value (horizontal location) and a y coordinate value (vertical location) of the user and a z coordinate value, which is the distance between the user and the display apparatus 100, based on the continuously photographed video. That is, the display apparatus 100 may detect the location of the user.

The controller 170 may use a central position of the display apparatus 100 as a criterion to calculate the location of the user. For example, in a case in which the location of the user in the photographed video is the very center of the video, the x coordinate value and the y coordinate value may be set to 0. In another example, in a case in which the user moves from the very center to the left in the video, the x coordinate value may have a negative number value. On the other hand, in a case in which the user moves from the very center to the right in the video, the x coordinate value may have a positive number value.

In this way, the y coordinate value may be calculated based on the location of the user.

Meanwhile, the distance between the user and the display apparatus 100, i.e. the z coordinate value, may be calculated based on the size of the user in the continuously photographed video. In a case in which the size of the user in the photographed video is large, it may be recognized that the distance between the user and the display apparatus 100 is short. On the other hand, in a case in which the size of the user in the photographed video is small, it may be recognized that the distance between the user and the display apparatus 100 is long.

In a case in which one camera is provided, the distance between a user 700 and the display apparatus 100 may be calculated based on the size of a face of the user, the size of each eye of the user, or the distance between the eyes of the user in a video photographed by the camera.

In a case in which a plurality of cameras is provided, the distance between the user 700 and the display apparatus 100 may be calculated based on the difference between videos photographed by the respective cameras.

In a case in which the camera 195 includes an infrared camera to detect the distance from the user, distance information may be acquired from the infrared camera.

Meanwhile, the controller 170 may further detect information regarding the position of each eye of the user at the time of detecting information regarding the location of the user. The controller 170 may recognize an eye area of the face of the user in the photographed video using a user face recognition algorithm. In addition, the controller 170 may detect position information regarding the eye area.

Subsequently, the display apparatus 100 increases a luminance variation of an input video with respect to each side area of the display module much more than that of the input video with respect to a central area of the display module according to the location of the user (S530). Subsequently, the display apparatus 100 displays a video with changed luminance (S540).

FIG. 6 illustrates by example that a predetermined video 40 is displayed on a flat display module 180. For example, in a case in which a user is not located at a position corresponding to a central area 30 of the video 40 but at a position corresponding to a first side area 32 of the video 40, a second side area 34 of the video 40 may be dark. In another example, in a case in which a user is not located at a position corresponding to the central area 30 of the video 40 but at a position corresponding to the second side area 34 of the video 40, the first side area 32 of the video 40 may be dark.

That is, the area of the video distant from the user may be dark.

In the embodiment of the present invention, the location of the user is detected and a luminance variation of an input video is changed based on the detected location of the user. In particular, luminance variation is increased with respect to one of the opposite sides of the display module which is more distant from the user. As a result, the area corresponding to the position more distant from the user is prevented from being dark.

Meanwhile, in the embodiment of the present invention, the change in luminance variation of an input video based on the location of the user is applied to a curved display module 10.

The display apparatus 100 according to the embodiment of the present invention includes a curved display module 10. In particular, the display apparatus 100 may include a display module 10, a middle portion of which recedes, as shown in FIG. 1.

In this case, the display module 10 is curved with uniform curvature. In a case in which the user is located at the very middle of the display module, therefore, a watching distance is uniform during watching a video displayed on the display apparatus 100. As a result, the user may feel a stereoscopic effect during watching of the video.

In the curved display module 10, the user may feel a stereoscopic effect during watching of the video. However, in a case in which a video having uniform luminance is displayed over the entire area of the display module 10, the user may feel that luminance over the entire area of the display module 10 is not uniform.

In particular, the user may recognize that luminance at each side area of the curved display module 10 is lower than that at the central area of the curved display module 10.

In a case in which light emitted from a lighting device around the display apparatus 100 is nonuniformly incident upon the display module or in a case in which instantaneous inclinations at points of the display module 10 are different from each other although the curvature of the display module 10 is uniform, luminance the user feels may be changed.

For this reason, in the embodiment of the present invention, luminance of an input video is changed such that the user can feel uniform luminance with respect to the curved display module 10. In this case, luminance of the input video is changed such that a luminance variation of a first area of the input video is greater than that of a second area of the input video.

Specifically, luminance of the input video is changed such that a luminance variation of the first area corresponding to each side area of the curved display module 10 is greater than that of the second area corresponding to the central area of the curved display module 10.

To this end, the controller 170 of the display apparatus 100 detects luminance per pixel or per block of the input video and changes luminance per pixel or per block of the input video. For example, a luminance variation of the first area may be set to +7 and a luminance variation of the second area may be set to +3.

In addition, the controller 170 may control the video, luminance of which has been changed, to be displayed on the curved display module 10. As a result, the user may watch the video, brightness of which is more improved with respect to each side area.

FIG. 7 illustrates by example that the curved display module 10 is divided into a plurality of areas and a luminance variation of an input video is changed such that luminance variations of the input video at the respective areas are different from each other.

In a case in which the user 700 is located at a position corresponding to a central area of the curved display module 10 as shown in FIG. 7, the controller 170 may control a luminance variation of the input video to gradually increase from the central area to opposite side areas A1, A2, B1, B2, C1, C2, D1, and D2.

At this time, it is assumed that overall luminance of the input video has a luminance level L2. That is, luminance may be increased with respect to an input video having a predetermined luminance level L2 such that luminance variations of the input video at the respective areas are different from each other.

In FIG. 7, a luminance level L6 of the areas A1 and A2 adjacent to the central area is greater than a luminance level L5 of the central area. In addition, a luminance level L7 of the areas B1 and B2 adjacent to the areas A1 and A2 is greater than the luminance level L6 of the areas A1 and A2, a luminance level L8 of the areas C1 and C2 adjacent to the areas B1 and B2 is greater than the luminance level L7 of the areas B1 and B2, and a luminance level L9 of the areas D1 and D2 adjacent to the areas C1 and C2 is greater than the luminance level L8 of the areas C1 and C2.

That is, the luminance variation of the input video may be gradually increased from the central area to the side areas.

Although the luminance variation of the input video is gradually increased from the central area to the side areas on the premise that external light around the display apparatus 100 is uniformly incident upon the display module 10 in FIG. 7, luminance variations of the input video at the respective areas may be further adjusted in consideration of a case in which external light around the display apparatus 100 is nonuniformly incident upon the display module 10.

In a case in which the display apparatus 100 includes an illuminance sensor (not shown) to measure illuminance of external light around the display apparatus 100, the illuminance sensor may sense the intensity of light incident upon the entire area of the display module 10. For example, in a case in which a lighting device is disposed above the display module 10 with the result that an amount of external light incident upon the upper area of the display module 10 is greater than that of the external light incident upon the lower area of the display module 10, the controller 170 may control the luminance variation such that the luminance variation at the lower area of the display module 10 is greater than that at the upper area of the display module 10. Consequently, the luminance level may be changed in consideration of external light, such as light emitted from the lighting device around the display apparatus 100, with the result that the display apparatus 100 displays a stereoscopic video with further improved luminance.

FIG. 8 is a graph illustrating a relationship between input luminance and output luminance of a video. In particular, FIG. 8 is a gamma curve graph illustrating the change in luminance at the respective areas of the curved display module 10.

As can be seen from FIG. 8, output luminance levels at the areas A, B, C, and D are sequentially greater than that at the central area.

Operation of the output luminance to the input luminance may be performed by the controller 170. In particular, operation of the output luminance may be performed based on a table of luminance variation per area prestored in the memory 140.

Meanwhile, control of the luminance variation results in the change in level of current flowing in pixel devices per area of the display module.

FIG. 9 is a circuit diagram illustrating a sub cell in a case in which the curved display module 10 is an organic light emitting display panel.

The sub cell may be a green (G), red (R), blue (B), or white (W) organic light emitting sub cell.

The sub cell may include a switching transistor SW TFT, a storage capacitor Cst, a driving transistor DRV TFT, and an organic light emitting layer OLED. A scan line is connected to a gate terminal of the switching transistor SW TFT such that the switching transistor SW TFT is turned on according to an input scan signal. In a case in which the switching transistor SW TFT is turned on, the switching transistor SW TFT may transmit an input data signal to a gate terminal of the driving transistor DRV TFT or one end of the storage capacitor Cst.

The storage capacitor Cst is provided between the gate terminal and a source terminal of the driving transistor DRV TFT. The storage capacitor Cst stores a difference between a data signal level transmitted to one end of the storage capacitor Cst and a direct current power VDD level transmitted to the other end of the storage capacitor Cst.

For example, in a case in which a data signal has different levels according to pulse amplitude modulation, power level stored in the storage capacitor Cst is changed according to the difference between the levels of the data signal.

In another example, in a case in which a data signal has different pulse widths according to pulse width modulation, power level stored in the storage capacitor Cst is changed according to the difference between the pulse widths of the data signal.

The driving transistor DRV TFT is turned on according to the power level stored in the storage capacitor Cst. In a case in which driving transistor DRV TFT is turned on, driving current IOLED proportional to the power level stored in the storage capacitor Cst flows in the organic light emitting layer OLED. As a result, the organic light emitting layer OLED performs a light emitting operation.

In conclusion, when the luminance variation per area of the input video corresponding to the curved display module 10 is changed as described above, the level of current flowing in the switching transistor SW TFT, the storage capacitor Cst, the driving transistor DRV TFT, and the organic light emitting layer OLED disposed in each corresponding area is changed.

Specifically, a level of current IOLED1 flowing in a sub cell disposed in an area corresponding to the side area of the curved display module 10 becomes greater than a level of current IOLED2 flowing in a sub cell disposed in an area corresponding to the central area of the curved display module 10. Such variable control of the current level is performed by the controller 170.

Although the size of the central area of the curved display module 10 is the greatest and the size of the side areas of the curved display module 10 is less than that of central area of the curved display module 10 in FIG. 7, the present invention is not limited thereto. For example, the central area and the side areas of the curved display module 10 may have the same size. Alternatively, the size of the respective areas of the curved display module 10 may be gradually decreased from the central area to the side areas of the curved display module 10.

Although the curved display module 10 is divided into 9 areas in FIG. 7, the present invention is not limited thereto. For example, the curved display module 10 may be divided into 3, 5, or 7 areas.

FIGS. 10 to 13 are views illustrating the change in luminance of an input video based on the location of a user.

First, FIG. 10 illustrates that the user 700 moves to the left by a first distance D1 as compared with FIG. 7.

In this case, the controller 170 detects movement of the user through the camera 195 and controls a luminance variation such that a luminance variation of a right side area D2 is greater than that of a left side area D1.

That is, as shown in FIG. 10, the area A1 corresponding to the location of the user becomes a new criterion. A luminance level of the area A1 is set to L5, a luminance level of the area B1 and the central area symmetric with respect to the area A1 is set to L6, which is higher than L5, a luminance level of the areas C1 and A2 is set to L7, which is higher than L6, a luminance level of the areas D1 and B2 is set to L8, which is higher than L7, and luminance levels L9 and L10 are gradually increased toward the areas C2 and D2.

As a result, luminance at the side areas distant from the user is improved based on the location of the user. Consequently, the user may watch a stereoscopic video with improved luminance.

Next, FIG. 11 illustrates that the user 700 moves to the left by a second distance D2, which is longer than the first distance D1, as compared with FIG. 10.

In this case, the controller 170 detects movement of the user through the camera 195 and controls a luminance variation such that a luminance variation of the right side area D2 is greater than that of the left side area D1.

That is, as shown in FIG. 11, the area B1 corresponding to the location of the user becomes a new criterion. A luminance level of the area B1 is set to L5, a luminance level of the areas C1 and A1 symmetric with respect to the area B1 is set to L6, which is higher than L5, a luminance level of the area D1 and the central area is set to L7, which is higher than L6, and luminance levels L8, L9, L10, and L11 are gradually increased toward the areas A2, B2, C2, and D2.

As compared with FIG. 10, it can be seen that the luminance level of the right area is increased and the luminance level of the left area is decreased.

As a result, luminance at the side areas distant from the user is improved based on the location of the user. Consequently, the user may watch a stereoscopic video with improved luminance.

Next, FIG. 12 illustrates that the user 700 is located at the left side by the first distance D1 but the distance between the user 700 and the display apparatus 100 is increased from Da to Db as compared with FIG. 11.

In this case, the controller 170 detects movement of the user through the camera 195 and controls a luminance variation such that, when luminance of the input video is changed, the luminance variation is increased as the distance between the user 700 and the display apparatus 100 is increased.

That is, the area A1 corresponding to the location of the user becomes a criterion. A luminance level of the area A1 is set to L8, which is three level higher than in FIG. 10, a luminance level of the area B1 and the central area symmetric with respect to the area A1 is set to L9, which is higher than L8, a luminance level of the areas C1 and A2 is set to L10, which is higher than L9, a luminance level of the areas D1 and B2 is set to L11, which is higher than L10, and luminance levels L12 and L13 are gradually increased toward the areas C2 and D2.

That is, as compared with FIG. 10, it can be seen that the luminance level is increased by about three levels.

As a result, luminance of the input video is improved based on the distance between the user and the display apparatus. Consequently, the user may watch a stereoscopic video with improved luminance.

Next, FIG. 13 illustrates that the user 700 moves to the right by the first distance D1 in opposition to FIG. 10.

In this case, the controller 170 detects movement of the user through the camera 195 and controls a luminance variation such that a luminance variation of the left side area D1 is greater than that of the right side area D2.

That is, as shown in FIG. 13, the area A2 corresponding to the location of the user becomes a new criterion. A luminance level of the area A2 is set to L5, a luminance level of the area B2 and the central area symmetric with respect to the area A2 is set to L6, which is higher than L5, a luminance level of the areas C2 and A1 is set to L7, which is higher than L6, a luminance level of the areas D2 and B1 is set to L8, which is higher than L7, and luminance levels L9 and L10 are gradually increased toward the areas C1 and D1.

As a result, luminance at the side areas distant from the user is improved based on the location of the user. Consequently, the user may watch a stereoscopic video with improved luminance.

Next, FIG. 14 illustrates that plural users are located in front of the display apparatus 100.

In this case, the controller 170 may detect locations of the users through the camera 195 and change luminance of an input video based on average location of the users.

FIG. 14 illustrates that a first user 700*a* is located in front of the area C1, a second user 700*b* is located in front of the central area, and luminance of the video is changed based on the area A1, which is an average thereof. That is, luminance per area is changed in the same manner as in FIG. 10 on the assumption that a third user 700*c* is located in front of the area A1.

On the other hand, in a case in which plural users are located in front of the display apparatus 100, weights may be assigned to the respective users, a representative location representing the users may be calculated, and luminance of the video may be changed based on the representative location unlike FIG. 14.

For example, in a case in which one of the first user 700*a* and the second user 700*b* shown in FIG. 14, e.g. the second user 700*b*, does not watch the video displayed on the display apparatus 100, a weight of 1 may be assigned to the first user 700*a* and a weight of 0 may be assigned to the second user 700*b*. That is, the location of the first user 700*a* may be calculated as a representative location and luminance per area may be changed based on the location of the first user 700*a*.

In another example, in a case in which one of the first user 700*a* and the second user 700*b* shown in FIG. 14, e.g. the second user 700*b*, watches the video displayed on the display apparatus 100 during a watching time equivalent to 50% the watching time of the first user 700*a*, a weight of ⅔ may be assigned to the first user 700*a* and a weight of ⅓ may be assigned to the second user 700*b* to calculate representative location. The representative location may approximately correspond to the area B1. Consequently, luminance of the video may be changed based on the area B1.

Meanwhile, a video watching time per user may be calculated based on a time during which the face or the gaze of each user is directed to the display apparatus 100 through a video photographed by the camera 195.

Although luminance of the video is changed based on the x coordinate (left and right movement) or the z coordinate (near or distant) of the location of the user in FIGS. 10 to 14, the present invention is not limited thereto. For example, luminance of the video may be changed based on the y coordinate (upward and downward movement or location of the eyes of each user), which will hereinafter be described with reference to FIGS. 15 and 16.

First, FIG. 15(*a*) illustrates that the location of the eyes 702 of the user corresponds to a height H1 of the display apparatus, which is the middle of the display apparatus. In this case, the controller 170 may change luminance irrespective of distinction between the upper and lower areas of the display module.

On the other hand, FIG. 15(*b*) illustrates a case in which the eyes 702 of the user moves to the left by D1 in a state in which the eyes 702 of the user are located at the height H1 of the display apparatus, which is the middle of the display apparatus. In this case, luminance per area may be changed in the same manner as in FIG. 10. That is, the luminance level at the right side area may be increased.

Next, FIG. 16(*a*) illustrates that the location of the eyes 702 of the user corresponds to a height H2 of the display apparatus, which is higher than the height H1 of the display apparatus, i.e. the middle of the display apparatus. In this case, the controller 170 may control a luminance variation to be changed with respect to any one vertical line of the display module based on the gaze position of the user.

That is, the controller 170 may control a luminance level to be symmetrically increased based on the height H2 of the display apparatus, which corresponds to the gaze position of the user.

Meanwhile, FIG. 16(*b*) illustrates that the display module is divided into the upper area A1 and the lower area A2 with respect to the height H2, the respective areas center, A1, A2, B1, B2, C1, C2, D1, and D2 in the upper area A1 have the same luminance levels as in FIG. 15(*b*), and the luminance levels of the respective areas center, A1, A2, B1, B2, C1, C2, D1, and D2 in the lower area A2 are one level higher than those of the respective areas center, A1, A2, B1, B2, C1, C2, D1, and D2 in the upper area A1 for the convenience of description. That is, a luminance variation may be increased as the gaze distance of the user is increased.

As a result, luminance of the input video is improved based on the gaze position of the user. Consequently, the user may watch a stereoscopic video with improved luminance.

FIG. 17 illustrates that a luminance variation of an input video is changed according to the radius of curvature.

Specifically, FIG. 17(*a*) illustrates that a curved display module 10*a* has a radius of curvature Ra and FIG. 17(*c*) illustrates that a curved display module 10*b* has a radius of curvature Rb, which is less than the radius of curvature Ra.

Meanwhile, FIG. 17(*b*) illustrates that the controller 170 changes luminance with respect to a pixel 820*a* based on the radius of curvature Ra of FIG. 17(*a*). Specifically, FIG. 17(*b*) illustrates that a luminance level is increased by one level from L6 to L7.

On the other hand, FIG. 17(*d*) illustrates that the controller 170 changes luminance with respect to a pixel 820*a* based on the radius of curvature Rb of FIG. 17(*c*). Specifically, FIG. 17(*d*) illustrates that a luminance level is increased by three levels from L6 to L9.

That is, it can be seen that as the radius of curvature is decreased, a luminance variation is increased with respect to the pixel on the same position. Consequently, a user may watch a stereoscopic video with improved luminance.

Although the luminance variation per area is uniform in FIGS. 7 to 17 except for FIG. 16 illustrating that luminance is changed with respect to the gaze of the user in a state in which the display module is divided into the areas, the present invention is not limited thereto.

That is, the luminance variation may be changed depending upon the location of the user even within each area. Alternatively, luminance may not be changed with respect to the entirety of each area but a portion of each area.

In addition, although the curved display module 10*a* is vertically divided into areas in FIGS. 7 to 17, the present invention is not limited thereto. For example, the curved display module may be divided into blocks having different sizes. In this case, as the number of the blocks is increased, the luminance level may be changed more accurately.

On the other hand, the luminance variation may be changed depending upon the overall luminance level of the input video. In a case in which the overall luminance level of the input video is high, a luminance increment per area may be set to smaller than in a case in which the overall luminance level of the input video is low. That is, in a case in which the input video has a luminance level of 150, the luminance level may be increased between +2 levels and +6 levels. On the other hand, in a case in which the input video has a luminance level of 50, the luminance level may be increased between +22 levels and +26 levels.

Meanwhile, although the display module 10 is curved with respect to the horizontal line and thus a luminance level variation of the video is changed from the central area to each side area in FIGS. 10 to 17, the present invention is not limited thereto.

For example, in a case in which the display module 10 is curved with respect to the vertical line, a luminance level variation of the video may be increased from the central area to the upper area or the lower area. That is, the luminance level may be further increased from the central area to the upper area or the lower area.

In a case in which the display module 10 is curved, therefore, the luminance level of the video displayed on the display module is increased such that the luminance level of the video displayed on the display module is higher than that of the input video. In particular, the luminance level variation may be further increased as the distance is increased in a direction in which the display module 10 is curved.

FIG. 18 illustrates that a luminance variation of an input video is changed in a case in which a display module 10*c* has a concave area 920 and a convex area 910.

In a case in which the display module 10*c* is a flexible display module having a plurality of radii of curvature as shown in FIG. 18(*a*), the controller may increase the luminance level of the input video with respect to the concave area 920 and decrease the luminance level of the input video with respect to the convex area 910.

Specifically, FIG. 18(*b*) illustrates an input video 901, FIG. 18(*c*) illustrates that a luminance level is increased by one level from a luminance level 820*a* of L6 to a luminance level 820*b* of L7 with respect to a pixel 915 of the input video 901 within an area Ad corresponding to the concave area 920, and FIG. 18(*d*) illustrates that a luminance level is decreased by one level from a luminance level 825*a* of L6 to a luminance level 825*b* of L5 with respect to a pixel 917 of the input video 901 within an area Ae corresponding to the convex area 910.

Consequently, a user may watch a stereoscopic video with improved luminance according to the curved characteristics of the display module 10*c*.

Meanwhile, the controller 170 may control the luminance variation to be increased as the distance between the user and the display apparatus is decreased. That is, in a case in which the user is located at the position Rb nearer than the position Ra, the luminance level may be increased by two levels from L6 to L8 with respect to the pixel 915 of the input video 901 within the area Ad corresponding to the concave area 920 and may be decreased by two levels from L6 to L4 with respect to the pixel 917 of the input video 901 within the area Ae corresponding to the convex area 910.

In this case, the display module 10*c* may be a display module adopted in a mobile terminal (not shown), a mobile phone. The display module 10*c* may be curved according to a curved state of the mobile terminal.

Although the concave area 920 and the convex area 910 have the same curvature in FIG. 18, the present invention is not limited thereto. For example, the concave area 920 and the convex area 910 may have different curvatures. In a case in which the concave area 920 and the convex area 910 may have different curvatures, smaller curvature may result in greater luminance variation as described with reference to FIG. 17.

Meanwhile, in a case in which the present invention is applied to the mobile terminal (not shown), the luminance variation may be decided in consideration of movement of the mobile terminal in addition to movement of the user. For example, in a case in which the mobile terminal moves to the right in a state in which the location of the user is fixed, which means that the user is located at the left side of the mobile terminal, the luminance variation may be decided in consideration of the same. For the mobile terminal, therefore, the luminance variation may be decided in consideration of the location of the user with respect to the mobile terminal.

FIG. 19 is a rear exploded perspective view showing a display apparatus according to another embodiment of the present invention.

Referring to FIG. 19, a display apparatus 500 according to this embodiment includes a display module 510 to display a video and a variable member 520 to change the shape of the display module 510. In addition, the display apparatus 500 may further includes a rear cover 530 to cover the rear of the display module 510. The above components constituting the display apparatus 500 will hereinafter be described in more detail.

The display module 510 may include a display panel 512 to actually display a picture, a support member 514 disposed at the rear of the display panel 512 to support the display panel 512, and a panel drive unit (not shown) fixed to the support member 514 to provide a signal to drive the display panel 512. Although not shown in FIG. 19, the display module 510 may further include a frame unit to cover the edge of the display panel 512 and the edge of the support member 514.

In this embodiment, the display panel 512 is a panel which is configured to adopt various structures and types to display a picture and is flexible such that the shape of the display panel can be changed by the variable member 520.

For example, the display panel 512 may be an organic light emitting display panel using an organic light emitting diode (OLED). The organic light emitting display panel is a self-emissive display panel using a principle in which, when current flows in a fluorescent or phosphorescent organic thin film, electrons and holes are coupled to one another in the organic thin film to generate light. The organic light emitting display panel has various advantages in that bright and vivid video quality is provided, a viewing angle is not restricted, and power consumption is low. In particular, the organic light emitting display panel may be manufactured by stacking the organic thin film. Consequently, the organic light emitting display panel may be flexible; however, the present invention is not limited thereto. For example, the present invention may be applied to various display panels 512 of various structures and types.

The support member 514 is disposed at the rear of the display panel 512 to support the display panel 512. In addition, the panel drive unit fixed to the rear of the support member 514 to drive the display panel 512 and the variable member 520 may be disposed at the rear of the support member 514. Consequently, the support member 514 may exhibit strength sufficient to be support and fix the display panel 512, the panel drive unit, and the variable member 520. In addition, the support member 514 may also exhibit flexibility and elasticity sufficient to correspond to the shape of the display panel 512 when the shape of the display panel 512 is changed. Furthermore, the support member 514 may also have a coefficient of thermal expansion similar to that of the display panel 512 to prevent generation of thermal stress.

For example, in this embodiment, the support member 514 may include a composite material, such as reinforced plastic. The composite material is a material manufactured by artificially combining two or more kinds of materials such that the composite material exhibits excellent properties. For example, in this embodiment, the support member 514 may include reinforced plastic, such as carbon fiber reinforced plastic (CFRP) and glass fiber reinforced plastic (GFRP). As a result, the support member 514 may exhibit lightweight and flexibility, which are achieved through the use of plastic, and high strength, elasticity, and wear resistance, which are achieved through the use of various fiber type reinforcement materials. The support member 514 may include a single composite material layer or a plurality of stacked composite material layers to provide high strength.

The support member 514 may be fixed to the rear of the display panel 512 using an adhesive (for example, a double-sided adhesive tape); however, the present invention is not limited thereto. The support member 514 may be fixed to the display panel 512 using various other methods.

The panel drive unit fixed to the rear of the support member 514 includes a circuit board (not shown) including various wires and devices to provide a signal to drive the display panel. The panel drive unit may be fixed to the support member 514 using a bracket (not shown). For example, only a central portion of the bracket may be fixed to the support member 514 to minimize force necessary to change the shape of the display panel 512; however, the present invention is not limited thereto. For example, a portion or the entirety of the panel drive unit may be disposed outside the display module 510. In this embodiment, the panel drive unit may include a wire and device to drive the variable member 520 (specifically, a drive unit 524).

The frame unit (not shown) may be provided to cover the edge of the display panel 512 and the edge of the support member 514. The frame unit protects the display panel 512 and the support member 514. In addition, the rear cover 530 is fixed to the frame unit using a fixing member (not shown). The frame unit may be configured to have various shapes and the rear cover 530 may be fixed to the frame unit using various structures and methods. A detailed description thereof will be omitted.

The variable member 520 to change the shape of the display panel is disposed at the rear of the display module 510 (more specifically, the support member 514). In this embodiment, the variable member 520 may include a transformation unit 522 and a drive unit 524 to provide mechanical energy to change the shape of the transformation unit 522.

In this embodiment, the transformation unit 522 may extend in one direction (for example, in a left and right direction of the display apparatus 500). When mechanical energy is provided by the drive unit 524, the shape of the transformation unit 522 may be changed such that a middle portion of the transformation unit 522 recedes and opposite side portions of the transformation unit 522 protrude. As a result, the display module 510 may be entirely curved such that the display module 510 has a predetermined radius of curvature R (see FIG. 22). When the shape of the display module 510 is changed as described above, the distance between the eyes of the user and the display panel 512 at the middle portion of the display panel 512 is equal to or slightly different from the distance between the eyes of the user and the display panel 512 at each side portion of the display panel 512. As a result, user immersion is improved. However, the present invention is not limited thereto. For example, the transformed shape of the transformation unit 522 may be changed and, therefore, the transformed shape of the display module 510 may be changed.

In FIG. 19, one transformation unit 522 is disposed at the upper part of the display module 510 and another transformation unit 522 is disposed at the lower part of the display module 510. This is because, in a case in which only one transformation unit 522 is disposed at the middle part of the display module 510, the edge of the display module 510 may not be easily transformed. In a case in which a plurality of transformation units 522 is provided as described above, it is possible to uniformly change the shape of the display module 510. However, the present invention is not limited thereto. For example, only one transformation unit 522 may be provided to reduce manufacturing cost and simplify the structure of the display apparatus. On the other hand, three or more transformation units 522 may be provided in consideration of the increase in size of the display module 510. Other different modifications may also be possible.

The transformation unit 522 includes a first part 622 fixed to the support member 514 of the display module 510 and a second part 624 disposed between the support member 514 and the first part 622. Opposite ends of the second part 624 are fixed to opposite ends of the first part 622.

A portion of the second part 624 is fixed to the drive unit 524 and the connection length of the second part 624 (i.e. the straight distance between the opposite ends of the first part 622 connected to the second part 624) is changed due to mechanical energy provided by the drive unit 524. As the connection length of the second part 624 is changed as described above, the shape of the first part 622 is changed, which will hereinafter be described in more detail with reference to FIG. 22. As the shape of the first part 622 is changed as described above, the first part 622 applies force to the display module 510 with the result that the shape of the display module 510 is also changed to correspond to the shape of the first part 622.

As described above, the first part 622 is a part, the shape of which is changed by the second part 622 to change the shape of the display module 510. For this reason, the first part 622 may include a material exhibiting high strength in addition to flexibility. In addition, the material constituting the first part 622 may be a lightweight material to reduce the weight of the display apparatus 500.

For example, the first part 622 may include a single layer of a composite material, such as reinforced plastic (CFRP, GFRP, etc.) or a plurality of composite material layers; however, the present invention is not limited thereto. For example, various materials may be used to form the first part 622. Meanwhile, the first part 622 may be formed in the shape of a band having a predetermined width W. In this case, the first part 622 may more effectively apply force to the display module 510. However, the present invention is not limited thereto. For example, the first part 622 may be formed to have various shapes.

A middle portion of the first part 622 is immovably fixed to the display module 510 (more specifically, the support member 514) and opposite ends of the first part 622 are movable. Since the opposite ends of the first part 622 are movable while the middle portion of the first part 622 is fixed, the shape of the first part 622 may be easily changed.

The middle portion of the first part 622 is immovably fixed to the display module 510 by a fixing member 622*a*. The distance between the middle portion of the first part 622 and the support member 514 may be greater than that between each end of the first part 622 and the support member 514. For example, the first part 622 may be disposed on the support member 514 such that the middle portion of the first part 622 can be more protrude toward the rear of the display module 510 and thus the first part 622 is rounded. As a result, display module 510 may be more easily transformed when the display module 510 is transformed to have a predetermined radius of curvature R as the length of the second part 624 is changed by the drive unit 524. The fixing member 622*a* may include pem nuts and fastening members such as screws. Easy and simple fastening is achieved using the pem nuts and the screws. However, the present invention is not limited thereto. The first part 622 may be fixed to the support member 514 using various structures.

Meanwhile, each end of the first part 622 may be movably fixed by a guide member fixed to the support member 514. Consequently, it is possible to movably fix the first part 622 while preventing transformation, such as drooping, of the opposite ends of the first part 622.

The guide member 626 includes a top part 626*a* spaced from the support member 514 by a predetermined distance and side parts 626*b* bent from the top part 626*a* such that the side parts 626*b* are adjacent to the support member 514. The side parts 626*b* are fixed to the support member 514 using fastening members 626*c*. For example, pem nuts 642 may be provided at the support member 514 and fastening members 626*c*, such as screws, may be fastened into the pem nuts 642 and fastening holes of the side parts 626*b* to fix the guide member 626 to the support member 514. The first part 622 may be fixed to the support member 514 using various structures. In this way, easy and simple fastening is achieved using the pem nuts and the screws. However, the present invention is not limited thereto. The side parts 626*b* may be fixed to the support member 514 using various structures.

The second part 624 is formed in the shape of a wire. The opposite ends of the second part 624 may be fixed to the opposite ends of the second part 624. The connection length of second part 624 may be changed as the second part 624 is wound on a rotary shaft 749 of the drive unit 524 or unwound from the rotary shaft 749 of the drive unit 524 in a state in which the second part 624 is fixed to the rotary shaft 749 of the drive unit 524, which will hereinafter be described in more detail.

Each end of the second part 624 may extend through a hole 622*b* formed at a corresponding end of the first part 622 and then be fixed to the first part 622 using a fixing member 628, such as an adhesive or a sealant; however, the present invention is not limited thereto. The opposite ends of the second part 624 may be fixed to the first part 622 using various other methods.

The second part 624 may be made of a material which does not extend or little extends under various conditions and exhibits high yield strength. This is because, if the second part 624 extends, it is difficult to accurately change the connection length of second part 624 and it is necessary to provided much more mechanical energy. For example, the second part 624 may include a metal wire (for example, a stainless steel wire), an aramid fiber, and a carbon steel wire. The second part 624 may have a diameter of 0.5 mm to 10 mm. If the diameter of the second part 624 is less than 0.5 mm, the second part 624 may be cut or deformed upon receiving energy from the drive unit 524. On the other hand, if the diameter of the second part 624 is greater than 10 mm, mechanical energy necessary to increase the connection length of second part 624 is increased with the result that cost is increased and configuration is complicated. However, the present invention is not limited thereto. For example, the second part 624 may be formed of various materials and have various diameters. In addition, although one second part 624 is provided for the first part 622 in FIG. 19, a plurality of second parts 624 may be provided for the first part 622.

The drive unit 524, which provides mechanical energy, may be formed to have various structures to change the shape of the transformation unit 522. Since the drive unit 524 changes the shape of the transformation unit 522 using mechanical energy as described above, it is possible to easily transform the transformation unit 522 and to accurately control a transformation degree and transformation time of the transformation unit 522. The drive unit 524 will hereinafter be described in more detail with reference to FIGS. 20 and 21.

FIG. 20 is a perspective view showing the drive unit of the display apparatus according to the embodiment of the present invention and FIG. 21 is a cutaway perspective view of FIG. 20.

In this embodiment, the drive unit 524 may include a motor 642 to provide rotary energy. For example, an ultrasonic motor may be used as the motor 642. The ultrasonic motor is a motor to convert frictional force generated between an ultrasonic vibrator and a mover into rotational force. The ultrasonic motor uses a piezoelectric effect of a piezoelectric ceramics. For this reason, the ultrasonic motor may also be referred to a piezoelectric motor.

The ultrasonic motor has a response time 10 times shorter than a conventional electromagnetic motor and generates greater force than the conventional electromagnetic motor. The ultrasonic motor uses an ultrasonic wave deviating from a human audible range as a driving frequency. Consequently, the ultrasonic motor has no operational noise. In addition, the structure of the ultrasonic motor is simple. For this reason, it is possible to manufacture a small-sized ultrasonic motor. Furthermore, since the ultrasonic motor does not include a magnet, the ultrasonic motor does not badly affect the display module 510 during driving of the display apparatus 500. In addition, since the ultrasonic motor has high holding torque and thus does not inversely rotate although voltage is not applied to the ultrasonic motor. Although additional power is not supplied to the display module 510 after the display module 510 is transformed, therefore, it is possible to maintain the transformed state of the display module 510. Consequently, it is possible to improve stability of the display module 510 when the display module 510 is transformed. In addition, an additional structure to maintain the transformed state of the display module 510 is not needed. Consequently, it is possible to simplify the structure of the drive unit 524.

The drive unit 524 may further include a speed reducer 644 to reduce speed of the motor 642 such that rotation energy is further increased. In a case in which such a speed reducer 644 is used, it is possible to greatly reduce the size of the motor 642. The speed reducer 644 may have a speed reduction ratio of 1:2 to 1:300. Within this range, mechanical energy sufficient to transform the transformation unit 522 may be provided while the size of the motor 642 is minimized. However, the speed reduction ratio of the speed reducer 644 may be changed based on kind of the motor 642 or structure of type of the transformation unit 522.

In this embodiment, the motor 642 and the speed reducer 644 are disposed in a housing 646.

The structure of the drive unit 524 may be simplified using the housing 646. The housing 646 may be fixed to the support member 514 by inserting fastening members 646b into fastening holes 646a of the housing 646. As a result, the drive unit 524 may be easily fixed to the support member 514. Pem nuts (not shown), into which the fastening members 646b are inserted, may be provided at the support member 514. As shown in FIG. 20, the housing 646 includes a first housing unit 647, in which the motor 642 is disposed, and a second housing unit 648, in which the speed reducer 644 is disposed. Consequently, interference between the motor 642 and the speed reducer 644 is prevented. However, the present invention is not limited thereto. For example, the motor 642 and the speed reducer 644 may be disposed in one housing unit. In addition, the housing 646 may be modified to have various structures.

The motor 642 and the speed reducer 644 may be disposed in parallel to each other in the housing 646 to reduce the thickness of the housing 646. As a result, it is possible to install the drive unit 524 while not increasing the thickness of the display apparatus 500. For example, in this embodiment, a portion of the housing 646, specifically the speed reducer 644, may be located between the display module 510 and the first part 642. In this case, the connection length of second part 624 may be adjusted as the second part 624 is wound on the rotary shaft 749 of the speed reducer 644 or unwound from the rotary shaft 749 of the speed reducer 644 in a state in which the second part 624 is fixed to the rotary shaft 749 of the speed reducer 644. The above disposition provides a spatial advantage. However, the present invention is not limited thereto. For example, the drive unit 524 may be spaced apart from the transformation unit 522.

The motor 642 includes a motor gear 741. The speed reducer 644 includes a ring gear 743 engaged with the motor gear 741, a plurality of planetary gears 745 disposed in the ring gear 743, a sun gear 747 engaged with the planetary gears 745, and a rotary shaft 749 connected to the sun gear 747. The rotary shaft 749 has a fixing part 749a to which the second part 624 is fixed. When the motor gear 741 of the motor 642 is rotated, the ring gear 743 engaged with the motor gear 741 is rotated. As a result, the planetary gears 745 and the sun gear 747 are rotated to rotate the rotary shaft 749. A plurality of layers of the planetary gears 745 may be provided to further increase a speed reduction ratio.

The rotary shaft 749 protrudes outward from the housing 646 toward the display module 510. A concave fixing part 749a is formed at the end of the rotary shaft 749. As the second part 644 is caught in the concave fixing part 749a, the middle portion of the second part 644 is fixed to the rotary shaft 749. Since the concave fixing part 749a is formed at the rotary shaft 749 to fix the second part 644 as described above, it is possible to easily fix the second part 644 without the provision of an additional member. However, the present invention is not limited thereto. The fixing part 749a may be formed to have various types or structures. In addition, the fixing part 749a may be disposed separately from the rotary shaft 749.

Although not shown, a route, along which the second part 644 is wound, may be formed at the outer circumference of the rotary shaft 749. In this case, the second part 644 may be more stably wound on the rotary shaft 749 during rotation of the rotary shaft 749.

In this embodiment, one drive unit 524 is provided for each transformation unit 522; however, the present invention is not limited thereto. For example, a plurality of transformation units 522 may be driven using one drive unit 524. In addition, in this embodiment, a planetary gear type speed reducer is used as the speed reducer 644. However, the speed reducer 644 may be formed to have various structures or types.

The rear cover 530 is disposed at the rear of the display module 510 and the variable member 520. The rear cover 530 protects the display module 510 and the panel drive unit from external impact while providing a space in which the panel drive unit is disposed. In addition, the rear cover 530 covers the panel drive unit to prevent the internal components from being seen from outside and to provide an aesthetically pleasing external appearance. For example, the rear cover 530 may be gently curved to secure a sufficient space and provide an aesthetically pleasing external appearance. In this embodiment, the rear cover 530 may be made of a material that can correspond to the change in shape of the display module 510 or formed to have a structure that that can correspond to the change in shape of the display module 510.

The change in shape of the display apparatus 500 with the above-stated construction will hereinafter be described in more detail with reference to FIG. 22. FIG. 22 is a view illustrating the change in shape of the display apparatus based on FIGS. 19 to 21. For reference, FIG. 22 is a sectional view taken along line V-V of FIG. 20. The guide member 626 and the rear cover 530 are omitted for clarity of the drawing.

In a state in which no manipulation is performed with respect to the display module 510, as shown in FIG. 22(a), the display module 510 is flat.

At this time, the middle portion of the first part 622 of the transformation unit 522 is immovably fixed by the fixing member 622a and the middle portion of the first part 622 may more protrude rearwards than the left and right edges of the first part 622. As a result, the shape of the display module 510 may be more easily changed. Each end of the first part 622 may be movably fixed by the guide member 266 (see FIG. 19). The second part 624 is fixed to a fixing part 749a (see FIG. 19) of the rotary shaft 749 of the drive unit 524.

When a user gives a command to change the shape of the display module 510, the drive unit 524 is driven by the element of the panel drive unit to drive the drive unit 524. For example, the motor 642 is rotated to rotate the rotary shaft 749 of the speed reducer 644. Consequently, the second part 624 fixed to the rotary shaft 749 is rotated along with the rotary shaft 749 with the result that at least a portion of the second part 624 is wound on the rotary shaft 749. Consequently, the connection length of the second part 624 is decreased and, therefore, the straight distance between the opposite ends of the first part 622 is decreased. As a result, the first part 622 is entirely curved and thus the shape of the first part 622 is changed such that the opposite ends of the first part 622 protrude. Consequently, the shape of the display module 510 is changed. As a result, as shown in FIG. 22(b), the display module 510 is transformed in the form of a curved surface having an entirely uniform radius of curvature R in the left and right direction thereof. Consequently, user immersion is further improved.

When the user gives a command to change the shape of the display module 510 into the original state, as shown in FIG. 22(a), the second part 644 is unwound from the rotary shaft 749 with the result that the connection length of the second part 644 is increased. Consequently, the transformation unit 522 returns to the initial state.

FIG. 23 is a reference view illustrating the change in curvature of the display apparatus of FIG. 19.

Referring to FIG. 23, the display apparatus 500 may be automatically curved when a user 1100 is detected and the display apparatus 500 may be restored into a flat panel display when the user 1100 is absent.

For example, when the user 1100 is detected through a camera (not shown), the controller 170 may control the variable member 520 such that the display apparatus 500 is curved concavely toward the user as shown in FIG. 23(b). On the other hand, when the user 1100 is not detected through the camera (not shown), the controller 170 may control the variable member 520 such that the display apparatus 500 is restored into a flat panel display as shown in FIG. 23(c).

The display apparatus according to the present invention is not be limitedly applied to the construction and method of the embodiments as described above; however, all or some of the embodiments may be selectively combined to achieve various modifications.

Meanwhile, the operation method of the display apparatus according to the present invention may be realized as code, which is readable by a processor included in the display apparatus, in recording media readable by the processor. The recording media readable by the processor includes all kinds of recording devices to store data which are readable by the processor. Examples of the recording media readable by the processor may include a read only memory (ROM), a random access memory (RAM), a compact disc read only memory (CD-ROM), a magnetic tape, a floppy disk, and an optical data storage device. In addition, the recording media readable by the processor may also be realized in the form of a carrier wave, such as transmission through the Internet. Furthermore, the recording media readable by the processor may be distributed to computer systems connected to each other through a network such that a code readable by the processor is stored or executed in a distribution mode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A display apparatus comprising:
   a video reception unit to receive an input video;
   a flexible display module; and
   a controller to change luminance of the input video such that a luminance variation of an area of the input video corresponding to a first area of the display module is greater than that of an area of the input video corresponding to a second area of the display module and control a video, the luminance of which has been changed, to be displayed when the flexible display module is curved,
   wherein in a case in which a user is located at a position corresponding to a central area of the curved display module, in a state that the flexible display module is curved with uniform curvature, and a middle portion of the flexible display module recedes, the controller is configured to change luminance of the input video such that a luminance variation of an area of the input video corresponding to a side area of the display module is greater than that of an area of the input video corresponding to the central area of the display module.

2. The display apparatus according to claim 1, wherein the controller changes the luminance of the input video such that the luminance variation is gradually increased toward each side area of the display module.

3. The display apparatus according to claim 1, wherein the controller increases the luminance of the video, the luminance of which has been changed, in comparison with the input video.

4. The display apparatus according to claim 1, wherein in a case in which the user is located at a position corresponding to outside of the central area of the curved display module,
   the controller changes the luminance of the input video such that the luminance variation at the time of changing the luminance at a first side area of the display module which is more distant from the central area a user is greater than that at the time of changing the luminance at a second side area of the display module.

5. The display apparatus according to claim 1, further comprising: a camera, wherein the controller detects location of a user based on a video of the user photographed by the camera and controls the luminance variation at the time of changing the luminance of the input video based on the location of the user.

6. The display apparatus according to claim 1, wherein, in a case in which plural users are present, the controller calculates a representative location based on locations of the users and changes the luminance of the input video based on the representative location.

7. The display apparatus according to claim 1, wherein the controller controls the luminance variation at the time of changing the luminance of the input video such that the luminance variation is increased as curvature of the display module is decreased.

8. The display apparatus according to claim 1, wherein the controller controls the luminance variation at the time of changing the luminance of the input video such that the luminance variation is increased as a distance between a user and the display apparatus is increased.

9. The display apparatus according to claim 1, wherein the display module has a concave area formed at a predetermined portion thereof.

10. The display apparatus according to claim 1, wherein the controller controls the luminance variation at the time of changing the luminance of the input video such that the luminance variation is increased as a distance from a gaze position of a user is increased.

11. The display apparatus according to claim 1, wherein the controller controls the luminance variation to be changed with respect to any one vertical line of the display module based on a gaze position of a user.

12. The display apparatus according to claim 1, further comprising:
an illuminance sensor to measure illuminance of external light around the display apparatus, wherein the controller further changes the luminance of the input video based on the illuminance of the external light.

13. The display apparatus according to claim 1, wherein the display module comprises a convex area and a concave area at which a shape of the display module is changed, and the controller increases a luminance level of an area of the input video corresponding to the concave area decreases a luminance level of an area of the input video corresponding to the convex area.

14. The display apparatus according to claim 1, further comprising a variable member to change a shape of the display module such that the display module is curved.

15. The display apparatus according to claim 1, wherein the display module comprises an organic light emitting display panel, and a level of current flowing in an area of the organic light emitting display panel corresponding to the first area is greater than that of current flowing in an area of the organic light emitting display panel corresponding to the second area.

16. A display apparatus comprising:
a video reception unit to receive an input video;
a flexible display module; and
a controller to control the display module such that a level of current flowing in an area of the input video corresponding to a first area of the display module is greater than that of current flowing in an area of the input video corresponding to a second area of the display module when the display module is curved,
wherein in a case in which a user is located at a position corresponding to a central area of the curved display module, in a state that the flexible display module is curved with uniform curvature, and a middle portion of the flexible display module recedes, the controller is configured to change luminance of the input video such that a luminance variation of an area of the input video corresponding to a side area of the display module is greater than that of an area of the input video corresponding to the central area of the display module.

17. An operation method of a display apparatus comprising a flexible display module, the operation method comprising:
receiving an input video;
changing luminance of the input video such that a luminance variation of an area of the input video corresponding to a first area of the display module is greater than that of an area of the input video corresponding to a second area of the display module when the display module is curved; and
displaying a video, the luminance of which has been changed,
wherein in a case in which a user is located at a position corresponding to a central area of the curved display module, in a state that the flexible display module is curved with uniform curvature, and a middle portion of the flexible display module recedes, wherein the changing includes changing luminance of the input video such that a luminance variation of an area of the input video corresponding to a side area of the display module is greater than that of an area of the input video corresponding to the central area of the display module.

18. The operation method according to claim 17, further comprising:
detecting location of a user,
wherein the step of changing the luminance of the input video comprises changing the luminance of the input video such that the luminance variation at the time of changing the luminance at a first side area of the display module which is more distant from the user is greater than that at the time of changing the luminance at a second side area of the display module.

19. The operation method according to claim 17, further comprising:
detecting location of a user, wherein the step of changing the luminance of the input video comprises changing the luminance of the input video such that the luminance variation at the time of changing the luminance of the input video is increased as a distance between the user and the display apparatus is increased.

20. The operation method according to claim 17, further comprising:
measuring illuminance of external light around the display module; and
further changing the luminance of the input video based on the illuminance of the external light.

* * * * *